(12) United States Patent
Sugita et al.

(10) Patent No.: US 9,659,712 B2
(45) Date of Patent: May 23, 2017

(54) MULTILAYER CERAMIC CAPACITOR

(71) Applicant: Murata Manufacturing Co., Ltd., Nagaokakyo-shi, Kyoto-fu (JP)

(72) Inventors: Hiroaki Sugita, Nagaokakyo (JP); Shota Kitano, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 98 days.

(21) Appl. No.: 14/822,917

(22) Filed: Aug. 11, 2015

(65) Prior Publication Data
US 2016/0049255 A1 Feb. 18, 2016

(30) Foreign Application Priority Data

Aug. 13, 2014 (JP) ................. 2014-164887

(51) Int. Cl.
*H01G 4/30* (2006.01)
*H01G 4/12* (2006.01)
*H01G 4/012* (2006.01)

(52) U.S. Cl.
CPC .............. *H01G 4/30* (2013.01); *H01G 4/012* (2013.01); *H01G 4/1218* (2013.01)

(58) Field of Classification Search
CPC ......... H01G 4/30; H01G 4/1209; H01G 4/232
USPC ..................................... 361/301.4
See application file for complete search history.

(56) References Cited

U.S. PATENT DOCUMENTS

| | | |
|---|---|---|
| 2008/0013252 A1 | 1/2008 | Nakano et al. |
| 2009/0009927 A1 | 1/2009 | Iguchi et al. |
| 2012/0152604 A1 | 6/2012 | Ahn et al. |
| 2012/0300361 A1 | 11/2012 | Togashi |
| 2013/0038979 A1 | 2/2013 | Togashi |
| 2013/0233606 A1 | 9/2013 | Fujii et al. |
| 2013/0319741 A1 | 12/2013 | Ahn et al. |
| 2014/0020942 A1 | 1/2014 | Cho et al. |
| 2014/0083755 A1 | 3/2014 | Lee et al. |
| 2014/0131082 A1 | 5/2014 | Ahn et al. |
| 2014/0151102 A1 | 6/2014 | Lee et al. |
| 2014/0153155 A1 | 6/2014 | Fujii et al. |
| 2014/0166351 A1 | 6/2014 | Lee et al. |
| 2014/0177134 A1* | 6/2014 | Awata ............... H01G 4/1236 361/321.5 |

FOREIGN PATENT DOCUMENTS

| | | |
|---|---|---|
| JP | 06-215978 A | 8/1994 |
| JP | 07-045469 A | 2/1995 |

(Continued)

OTHER PUBLICATIONS

Official Communication issued in corresponding Korean Patent Application No. 10-2015-0108136, mailed on Jun. 9, 2016.

*Primary Examiner* — Eric Thomas
*Assistant Examiner* — Michael P McFadden
(74) *Attorney, Agent, or Firm* — Keating & Bennett, LLP

(57) ABSTRACT

A multilayer ceramic capacitor includes a body and at least two outer electrodes. The body includes first and second main surfaces, an inner layer portion and first and second outer layer portions. In the inner layer portion, dielectric layers and conductive layers are alternately stacked on each other. The second outer layer portion includes an outer portion and an inner portion. A boundary region adjacent to the inner portion in the outer portion inclines toward the first main surface.

19 Claims, 20 Drawing Sheets

(56) References Cited

FOREIGN PATENT DOCUMENTS

| | | |
|---|---|---|
| JP | 9-129487 A | 5/1997 |
| JP | 2009-016547 A | 1/2009 |
| JP | 2012-248581 A | 12/2012 |
| JP | 2014-027085 A | 2/2014 |
| JP | 2014-033097 A | 2/2014 |
| JP | 2014-127504 A | 7/2014 |
| KR | 10-1058697 B1 | 8/2011 |
| WO | 2006/098092 A1 | 9/2006 |

* cited by examiner

MULTILAYER CERAMIC CAPACITOR

BACKGROUND OF THE INVENTION

1. Field of the Invention

The present invention relates to a multilayer ceramic capacitor, a multilayer ceramic capacitor series including the same, and a multilayer ceramic capacitor mount body including the same.

2. Description of the Related Art

An example of the related art that discloses a multilayer ceramic capacitor in which the occurrence of cracks may be suppressed is Japanese Unexamined Patent Application Publication No. 2012-248581. In the multilayer ceramic capacitor disclosed in this publication, a base unit includes an inner electrode body (inner layer portion) and first and second dielectric bodies (outer layer portions). The inner electrode body is constituted by first inner electrodes and second inner electrodes facing each other with a dielectric member therebetween and stacked on each other. The first and second dielectric bodies sandwich the inner electrode body therebetween in the stacking direction. The first dielectric body including a first main surface of the base unit is thicker than the second dielectric body including a second main surface of the base unit in the stacking direction.

One of the reasons why cracks occur is as follows. When a substrate having a multilayer ceramic capacitor mounted thereon is deflected due to an external force, an external stress is produced. This external stress acts on a dielectric layer of the multilayer ceramic capacitor, which causes the occurrence of cracks. The present inventors have discovered another reason why cracks occur. When a multilayer ceramic capacitor is subjected to firing, an internal stress is produced due to the difference in the coefficient of thermal contraction between dielectric layers and conductive layers. This internal stress acts on the boundary between the inner layer portion and the outer layer portion, thereby causing the occurrence of cracks (delamination).

In the multilayer ceramic capacitor disclosed in the above-described publication, the occurrence of cracks caused by an external stress may be suppressed, but the occurrence of cracks caused by an internal stress produced by the difference in the coefficient of thermal contraction between dielectric layers and conductive layers is not considered.

SUMMARY OF THE INVENTION

Preferred embodiments of the present invention provide a multilayer ceramic capacitor in which it is possible to significantly reduce or prevent the occurrence of cracks caused by an internal stress produced by the difference in the coefficient of thermal contraction between dielectric layers and conductive layers.

According to a preferred embodiment of the present invention, a multilayer ceramic capacitor includes a body and two outer electrodes. The body includes a plurality of dielectric layers and a plurality of conductive layers stacked on each other and includes first and second main surfaces opposing each other in a stacking direction. The two outer electrodes are disposed on at least some surfaces of the body and are electrically connected to at least some of the plurality of conductive layers. The plurality of conductive layers include first conductive layers connected to one of the two outer electrodes and second conductive layers connected to the other one of the two outer electrodes. The body includes first and second end surfaces which oppose each other so as to connect the first and second main surfaces and first and second side surfaces which oppose each other so as to connect the first and second main surfaces and also to connect the first and second end surfaces. The body includes an inner layer portion and first and second outer layer portions which sandwich the inner layer portion therebetween. The first and second conductive layers and at least some of the plurality of dielectric layers are stacked on each other in the stacking direction within the inner layer portion. The inner layer portion includes an area extending from a first outermost conductive layer positioned closest to the first main surface among the plurality of conductive layers through a second outermost conductive layer positioned closest to the second main surface among the plurality of conductive layers. The second outer layer portion includes an outer portion including the second main surface and an inner portion disposed between the outer portion and the inner layer portion. The composition ratio of Si to Ti of the dielectric layer included in the outer portion is higher than that of the dielectric layers included in the inner layer portion and the dielectric layer included in the inner portion. The outer portion includes a boundary region adjacent to the inner portion which has a larger Si content compared to a central region of the outer portion. The boundary region includes a portion which inclines toward the first main surface as the boundary region gets closer to one of the end surfaces or the side surfaces.

According to preferred embodiments of the present invention, the boundary region preferably is not a simple flat surface, but has a shape such that the outer portion clamps the inner portion via deformed portions. It is thus possible to significantly reduce or prevent the occurrence of cracks caused by an internal stress produced due to the difference in the coefficient of thermal contraction between dielectric layers and conductive layers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
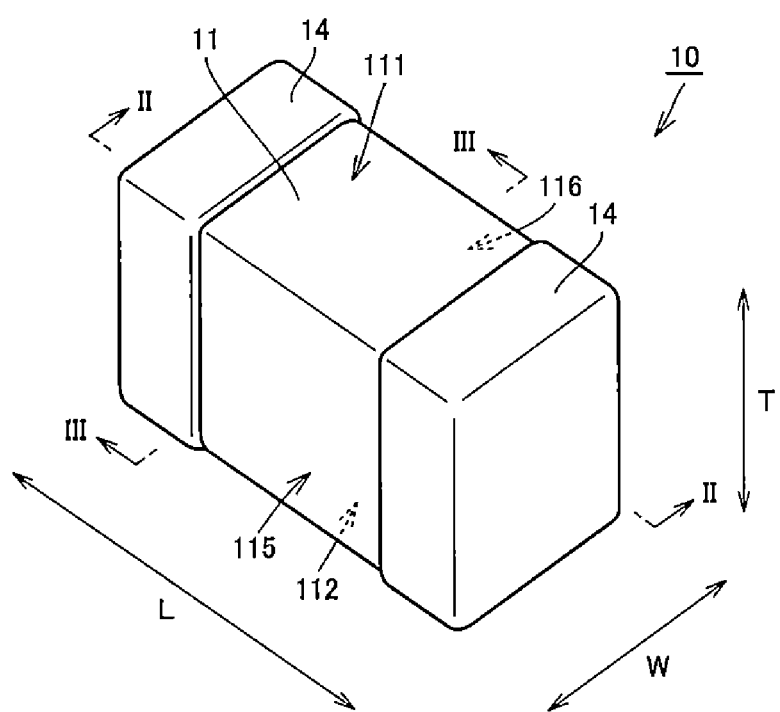
FIG. 1 is an external perspective view of a multilayer ceramic capacitor according to a first preferred embodiment of the present invention.

A description will be given below, with reference to the accompanying drawings, of a multilayer ceramic capacitor, a multilayer ceramic capacitor series including the same, and a multilayer ceramic capacitor mount body including the same according to preferred embodiments of the present invention. In the following description of the preferred embodiments, the same element or corresponding elements shown in the drawings are designated by like reference numeral, and an explanation thereof will be given only once. The multilayer ceramic capacitor will be simply referred to as a "capacitor".

First Preferred Embodiment

A capacitor 10 according to a first preferred embodiment of the present invention will be described below with reference to FIGS. 1 through 5.

Figure 2:
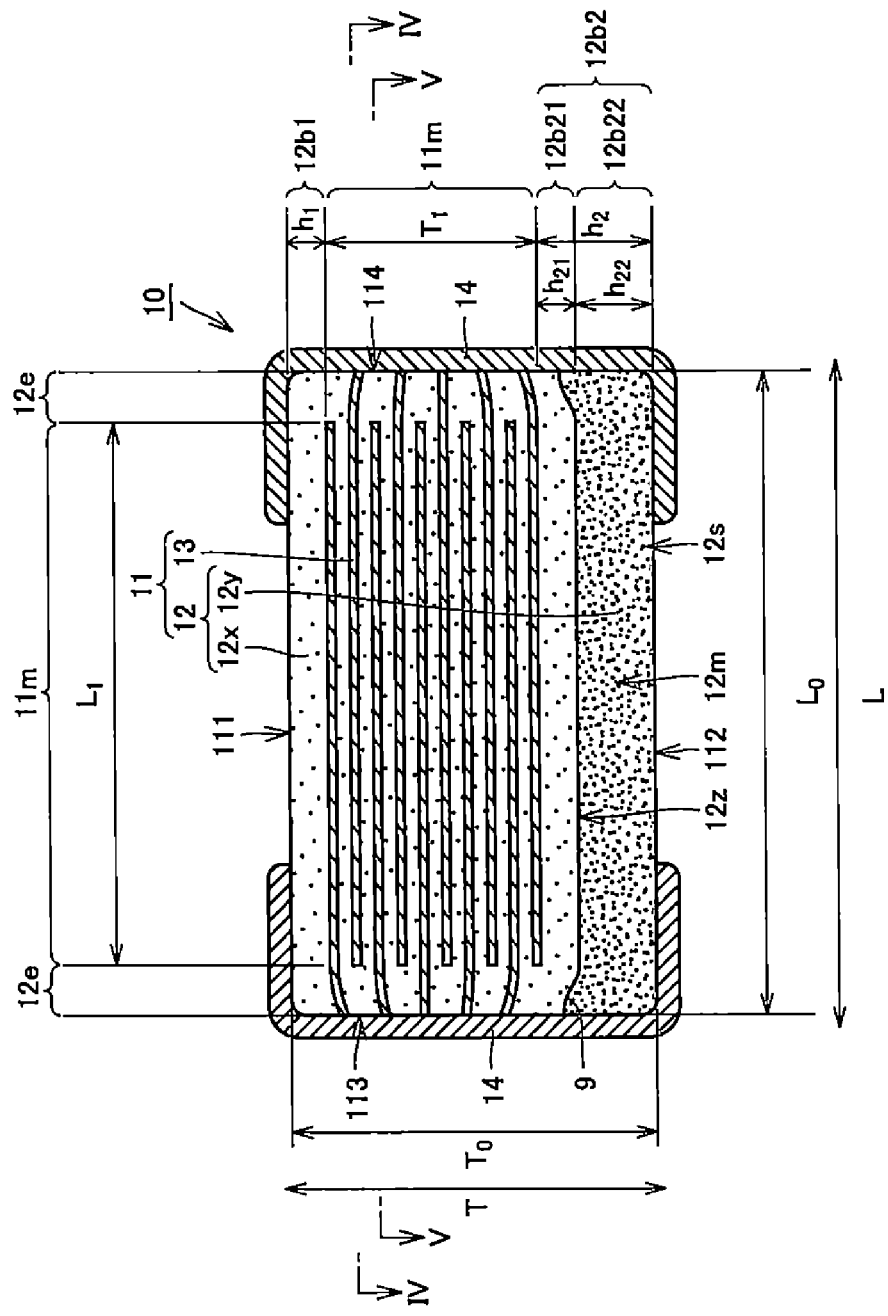
FIGS. 2 and 3 are sectional views taken along lines II-II and III-III, respectively, of FIG. 1.
Figure 3:
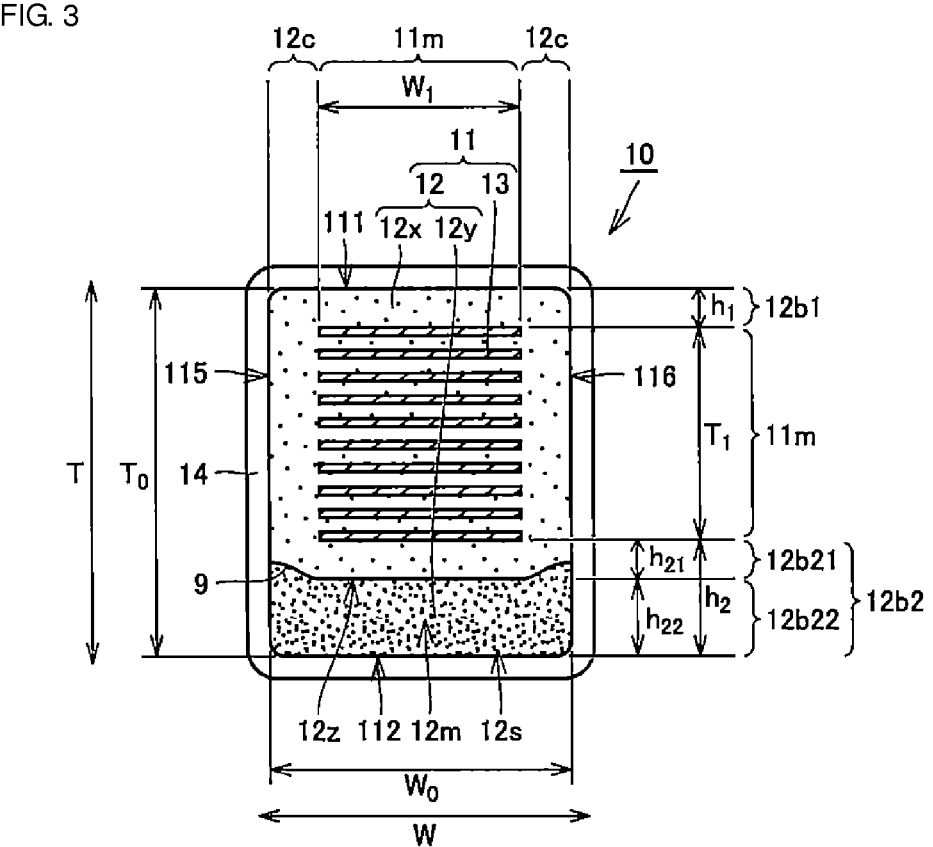
Figure 4:
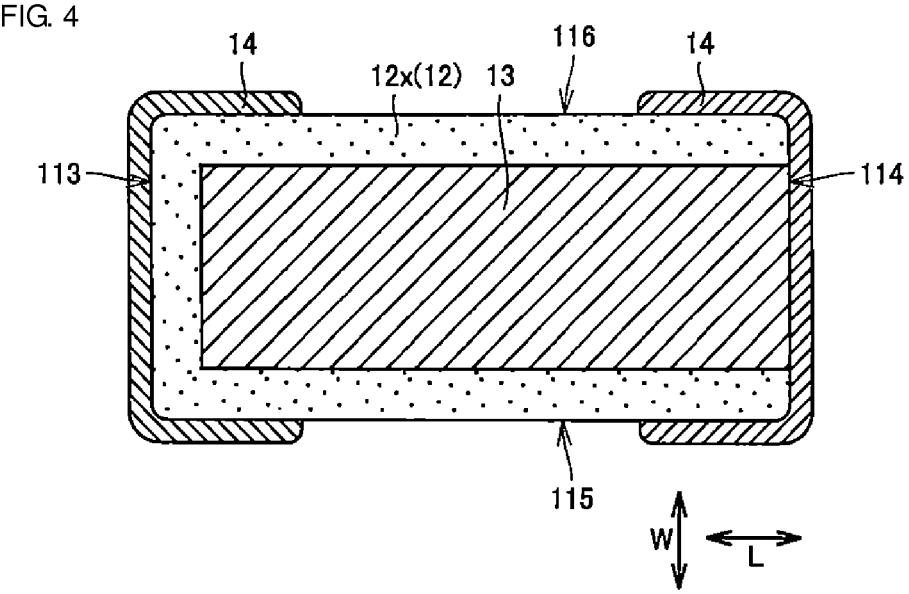
FIGS. 4 and 5 are sectional views taken along lines IV-IV and V-V, respectively, of FIG. 2.
Figure 5:
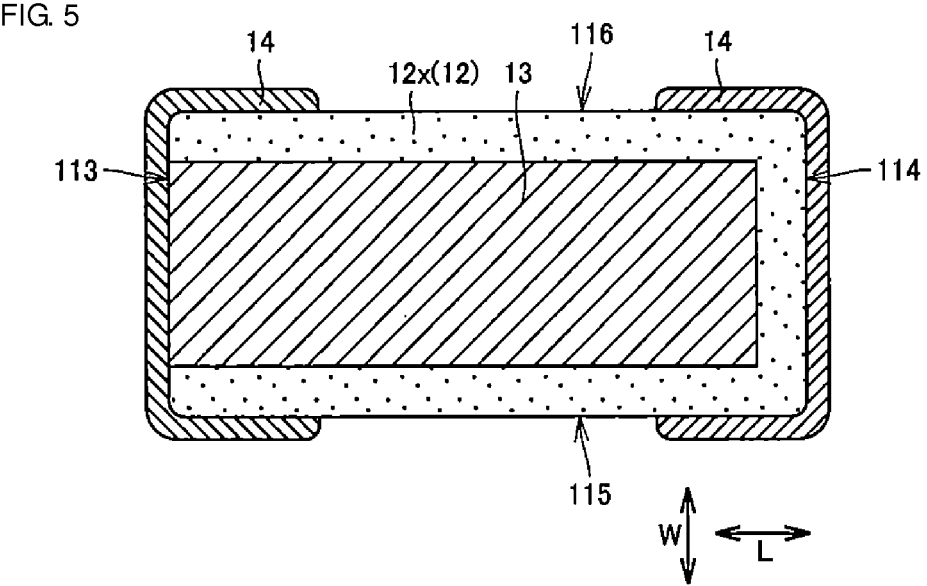

FIG. 1 is an external perspective view of the capacitor 10. FIGS. 2 and 3 are sectional views taken along lines II-II and III-III, respectively, of FIG. 1. FIGS. 4 and 5 are sectional views taken along lines IV-IV and V-V, respectively, of FIG. 2. In FIGS. 1 through 5, the length direction of a body 11, which will be discussed below, is indicated by L, the width direction thereof is indicated by W, and the height direction thereof is indicated by T.

The stacking direction of dielectric layers 12 and conductive layers 13 is perpendicular to the length direction L and the width direction W of the body 11. That is, the stacking direction of the dielectric layers 12 and the conductive layers 13 is parallel with the height direction T of the body 11.

The capacitor 10 includes the body 11 and two outer electrodes 14. The body 11 includes a plurality of dielectric layers 12 and a plurality of conductive layers 13 stacked on each other, and includes first and second main surfaces 111 and 112 opposing each other in the stacking direction. The two outer electrodes 14 are disposed on at least some surfaces of the body and are electrically connected to at least some of the plurality of conductive layers 13. The body 11 includes first and second end surfaces 113 and 114, which define and function as two end surfaces. The first and second end surfaces 113 and 114 oppose each other so as to connect the first and second main surfaces 111 and 112. The body 11 also includes first and second side surfaces 115 and 116, which serve as two side surfaces. The first and second side surfaces 115 and 116 oppose each other so as to connect the first and second main surfaces 111 and 112 also to connect the first and second end surfaces 113 and 114.

The shortest distance between the first and second side surfaces 115 and 116 is smaller than that between the first and second end surfaces 113 and 114. That is, the width $W_0$ of the body 11 in the width direction W is smaller than the length $L_0$ of the body 11 in the length direction L. The body 11 preferably has a rectangular or substantially rectangular parallelepiped shape, and may have a rounded portion at least in one of a corner and a ridge of the body 11.

The body 11 includes an inner layer portion 11m and first and second outer layer portions 12b1 and 12b2 which sandwich the inner layer portion 11m therebetween. The inner layer portion 11m includes an area extending from a first outermost conductive layer 13 positioned closest to the first main surface 111 to a second outermost conductive layer 13 positioned closest to the second main surface 112 in the stacking direction. In the inner layer portion 11m, some of the plurality of dielectric layers 12 and the plurality of conductive layers 13 are stacked on each other. The first outer layer portion 12b1 includes a first dielectric layer 12x, which is the dielectric layer positioned closest to the first main surface 111 among the plurality of dielectric layers 12. The second outer layer portion 12b2 includes an outer portion 12b22 and an inner portion 12b21. The outer portion 12b22 includes a second dielectric layer 12y, which is the dielectric layer positioned closest to the second main surface 112 among the plurality of dielectric layers 12. The inner portion 12b21 includes a dielectric layer 12x positioned between the outer portion 12b22 and the inner layer portion 11m. In the first preferred embodiment, the height $h_{21}$ of the inner portion 12b21 preferably is about 60 μm or smaller, for example.

As shown in FIG. 2, as viewed from the width direction, the body 11 includes end margin portions 12e between the inner layer portion 11m and the first and second end surfaces 113 and 114 in the length direction. In the end margin portions 12e, conductive layers 13 connected to one end surface do not extend to the other end surface. If the plurality of conductive layers 13 are alternately connected to the two end surfaces, in the end margin portion 12e at one end surface, about half the number of conductive layers 13 extend and connect to this end surface. The conductive layers 13 connected to the other end surface are not present in this end margin portion 12e, and a dielectric member fills portions from the positions at which such conductive layers 13 are disconnected to the end surface. In the end margin portion 12e at the other end surface, the remaining about half the number of conductive layers 13 extend to the other end surface. As viewed from the width direction, the outer portion 12b22 includes a boundary region 12z which is adjacent to the inner portion 12b21. The boundary region 12z includes portions boundary region in the end margin portions 12e incline toward the first main surface 111 as the boundary region 12z gets closer to the first and second end surfaces 113 and 114. That is, the boundary region 12z includes deformed portions 9.

As shown in FIGS. 2 and 3, the plurality of dielectric layers 12 include a plurality of first dielectric layers 12x and the second dielectric layer 12y, which are formed from ceramic green sheets made of different compositions, which will be discussed later.

The configuration of the first outer layer portion 12b1 is not restricted to that discussed above. The first outer layer portion 12b1 may include an outer portion including a second dielectric layer 12y positioned closest to the first main surface 111 and an inner portion including a first dielectric layer 12x positioned between the outer portion and the inner layer portion 11m.

In the inner layer portion 11m, first dielectric layers 12x, which are some of the plurality of dielectric layers 12, and all the conductive layers 13 are alternately stacked on each other. That is, the inner layer portion 11m includes all the conductive layers 13. In other words, if the conductive layers 13 connected to one end surface are referred to as "first conductive layers" and the conductive layers 13 connected to the other end surface are referred to as "second conductive layers", the inner layer portion 11m is a portion in which the first and second conductive layers are stacked on each other. All the conductive layers 13 preferably are rectangular or substantially rectangular, as viewed from above, as shown in FIGS. 4 and 5.

As shown in FIG. 2, all the conductive layers 13 may be electrically connected to either one of the two outer electrodes 14. In the first preferred embodiment, all the conductive layers 13 are electrically connected to one of the two outer electrodes 14. Alternatively, at least some of the conductive layers 13 may be electrically connected to one of the outer electrodes 14. That is, among the plurality of conductive layers 13, there may be some conductive layers 13 that are not electrically connected to any outer electrodes 14.

As shown in FIG. 2, the two outer electrodes 14 are disposed at both ends of the body 11 in the length direction L. More specifically, one of the two outer electrodes 14 is disposed at one end of the body 11 close to the first end surface 113 in the length direction L, while the other one of the two outer electrodes 14 is disposed at the other end of the body 11 close to the second end surface 114 in the length direction L. In the first preferred embodiment, one of the two outer electrodes 14 is disposed from the first end surface 113 continuously to the first and second main surfaces 111 and 112 and to the first and second side surfaces 115 and 116. The other one of the two outer electrodes 14 is disposed from the second end surface 114 continuously to the first and second main surfaces 111 and 112 and to the first and second side surfaces 115 and 116. However, the arrangement of the two outer electrodes 14 is not restricted to that described above. The two outer electrodes 14 may be disposed on some surfaces of the body 11 so that they can be electrically connected to the plurality of conductive layers 13 and so that the capacitor 10 can be mounted.

One of the two outer electrodes 14 is connected to some of the plurality of conductive layers 13 on the first end surface 113, while the other one of the two outer electrodes 14 is connected to the remaining conductive layers 13 on the second end surface 114. The conductive layers 13 connected to the first end surface 113 and the remaining conductive layers 13 connected to the second end surface 114 are alternately stacked on each other such that they face each other with a first dielectric layer 12x therebetween in the inner layer portion 11m.

As shown in FIG. 3, the height $T_1$ of the inner layer portion 11m in the stacking direction of the body 11 is greater than the width $W_1$ of the inner layer portion 11m where the plurality of conductive layers 13 are disposed in the width direction W of the body 11. The width direction W is a direction in which the first and second side surfaces 115 and 116 can be connected with the shortest distance. The height $T_1$ of the inner layer portion 11m may be greater than the width $W_0$ of the body 11 in a direction in which the first and second side surfaces 115 and 116 can be connected with the shortest distance.

The height $h_{22}$ of the outer portion 12b22 is equal to or greater than the height $h_{21}$ of the inner portion 12b21. The height $h_{22}$ of the outer portion 12b22 is preferably about 30 µm or greater, for example, which will be discussed later. The height $h_{21}$ of the inner portion 12b21 is preferably about 20 µm or greater, for example, which will be discussed later.

In the first preferred embodiment, the second outer layer portion 12b2 is thicker than the first outer layer portion 12b1. That is, the height $h_2$ of the second outer layer portion 12b2 is greater than the height $h_1$ of the first outer layer portion 12b1. The inner portion 12b21 is thicker than the first outer layer portion 12b1. That is, the height $h_{21}$ of the inner portion 12b21 is greater than the height $h_1$ of the first outer layer portion 12b1.

The height $T_0$ of the body 11 in the stacking direction of the body 11 is equal to the total height of the height $T_1$ of the inner layer portion 11m, the height $h_1$ of the first outer layer portion 12b1, and the height $h_2$ of the second outer layer portion 12b2.

In the first preferred embodiment, the deformed portion 9 is preferably provided at each end of the boundary region 12z in the length direction L. Accordingly, the boundary region 12z, as a whole, is not a simple flat surface. It is thus less likely that delamination will occur between the first dielectric layer 12x and the second dielectric layer 12y. The boundary region 12z preferably has a shape such that the outer portion 12b22 clamps the inner portion 12b21 therebetween via the deformed portions 9. Accordingly, when the outer portion 12b22 contracts, it compresses the inner portion 12b21, and as a result, the inner portion 12b21 compresses the inner layer portion 11m. Thus, it is also less likely that cracks will occur at and near the corners of the inner layer portion 11m close to the second main surface 112.

Modified Example

Figure 6A:
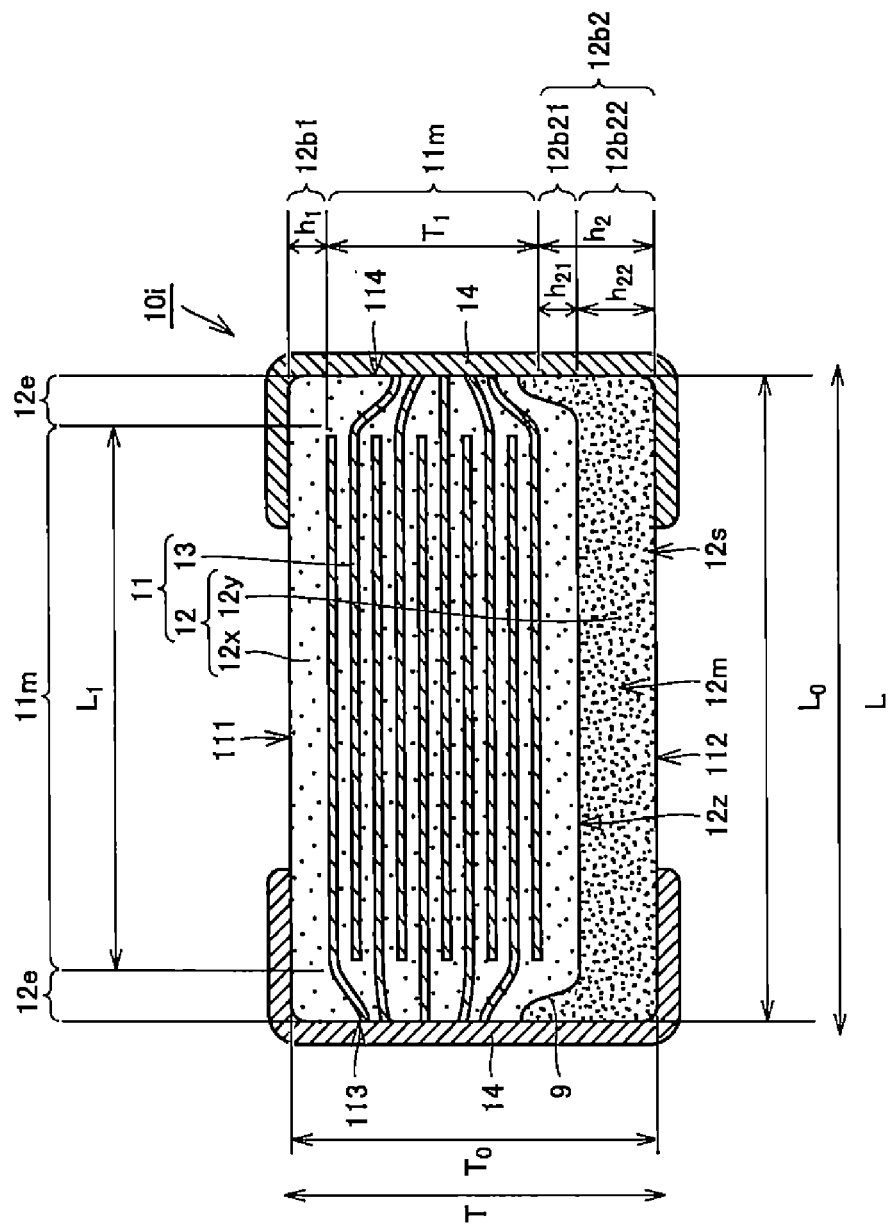
FIGS. 6A and 6B are sectional views illustrating a modified example of the multilayer ceramic capacitor of the first preferred embodiment of the present invention.

More preferably, instead of the capacitor 10, a capacitor 10i configured as shown in FIG. 6A is used. That is, it is preferable that, as viewed from the width direction, the points of the boundary region 12z which reach the end surfaces 113 and 114 belong to a region where the inner layer portion 11m is projected toward the end surfaces 113 and 114. That is, as shown in FIG. 6A, the positions at which both ends of the boundary region 12z are in contact with the first and second end surfaces 113 and 114 are closer to the first main surface 111 than the second outermost conductive layer 13 is. In other words, in a cross section perpendicular to a direction in which the first and second side surfaces 115 and 116 are connected to each other (in particular, a cross section passing through the center of the body 11), the distance between the points of the boundary region 12z which reach the first and second end surfaces 113 and 114 and the second main surface 112 is greater than the shortest distance between the inner layer portion 11m and the second main surface 112. In this manner, if the deformed portions 9 penetrate deeply to such a degree as to reach the side area of the inner layer portion 11m, the outer portion 12b22 reliably clamps, not only the inner portion 12b21, but also the inner layer portion 11m therebetween, via the deformed portions 9. It is thus even less likely that cracks will occur at and near the corners of the inner layer portion 11m close to the second main surface 112.

Figure 6B:
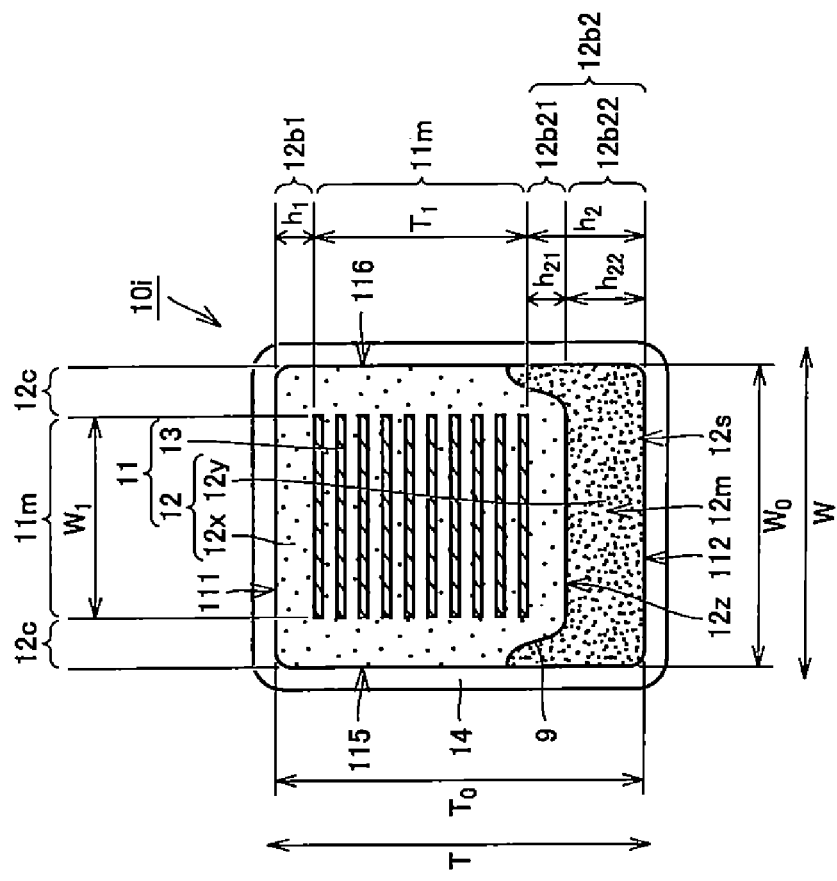

A WT cross section of the capacitor 10i shown in FIG. 6A is represented by the one shown in FIG. 6B. It is preferable that, as viewed from the length direction, the points of the boundary region 12z which reach the side surfaces 115 and 116 belong to a region where the inner layer portion 11m is projected toward the first and second side surfaces 115 and 116. As shown in FIG. 6B, the positions at which both ends of the boundary region 12z are in contact with the first and second side surfaces 115 and 116 are closer to the first main surface 111 than the conductive layer 13 within the inner layer portion 11m positioned closest to the second main surface 112 is. With this configuration, too, it is even less likely that cracks will occur at and near the corners of the inner layer portion 11m close to the second main surface 112.

Referring back to FIGS. 1 to 5, a description of the configuration of the capacitor 10 will continue.

As shown in FIG. 3, as viewed from the length direction, the body 11 includes side margin portions 12c between the inner layer portion 11m and the first and second side surfaces 115 and 116 in the width direction. In the side margin portions 12c, the conductive layers 13 do not extend to the first and second side surfaces 115 and 116, in other words, the conductive layers 13 are not present, and a dielectric member fills the side margin portions 12c. As viewed from the length direction, the outer portion 12b22 includes a boundary region 12z which is adjacent to the inner portion 12b21, the boundary region includes portions in the side margin portions 12c which incline toward the first main surface 111 as the boundary region 12z gets closer to the first and second side surfaces 115 and 116. That is, the boundary region 12z includes deformed portions 9.

Since the conductive layers 13 are not contained within the side margin portions 12c, the density of the side margin portions 12c is smaller than that of the end margin portions 12e. Accordingly, it is preferable that the deformation amount of the deformed portions 9 of the boundary region 12z in the side margin portions 12c be greater than that of the deformed portions 9 of the boundary region 12z in the end margin portions 12e.

In other words, the distance between the points of the boundary region 12z which reach the first and second side surfaces 115 and 116 and the second main surface 112 in a cross section passing through the center of the body 11 and being perpendicular to a direction in which the first and second end surfaces 113 and 114 are connected to each other is greater than the distance between the points of the boundary region 12z which reach the first and second end surfaces 113 and 114 and the second main surface 112 in a cross section passing through the center of the body 11 and being perpendicular to a direction in which the first and second side surfaces 115 and 116 are connected to each other. That is, a maximum distance in the stacking direction T between the second main surface 112 and the boundary region 12z at a cross section of the body 11 which is perpendicular to the length direction L and including a center of the body 11 is greater than a maximum distance in the stacking direction T between the second main surface 112 and the boundary region 12z at a cross section of the body 11 which is perpendicular to the width direction W and including the center of the body 11.

As shown in FIG. 2, as viewed from the width direction, a portion of the first outermost conductive layer 13 in the end margin portion 12e preferably inclines toward the second main surface 112 as the first outermost conductive layer 13 gets closer to one of the first and second end surface 113 and 114 which is connected to the first outermost conductive layer 13. Similarly, a portion of the second outermost conductive layer 13 in the end margin portion 12e preferably inclines toward the first main surface 111 as the second outermost conductive layer 13 gets closer to one of the first and second end surface 113 and 114 which is connected to the second outermost conductive layer 13. With this arrangement, in the first and second outermost conductive layers 13, cracks (delamination) caused by the difference in the thermal contraction are less likely to occur. Since the second outer layer portion 12b2 is thicker than the first outer layer portion 12b1, the difference in the thermal contraction in the second outermost conductive layer 13 is increased, and cracks are likely to occur. Accordingly, the amount by which the second outermost conductive layer 13 inclines is preferably greater than that by which the first outermost conductive layer 13 inclines. The amounts by which the first and second outermost conductive layers 13 incline are determined by a method similar to that for measuring the shortest distance d when evaluating the nonlinearity of the boundary region 12z in third and fourth experiments, which will be discussed later.

It is preferable that, in the width direction W of the body 11, the maximum width of the side margin portions 12c provided between each of the first and second side surfaces 115 and 116 and the inner layer portion 11m be greater than the height $h_1$ of the first outer layer portion 12b1. It is also preferable that the average width $((W_0-W_1)/2)$ of the side margin portions 12c be greater than the height $h_1$ of the first outer layer portion 12b1. It is more preferable that the maximum width or the average width $((W_0-W_1)/2)$ of the side margin portions 12c be greater than about 30 µm and smaller than about 90 µm, for example. It is also preferable that the maximum width of the side margin portions 12c be greater than the height $h_{21}$ of the inner portion 12b21. The maximum width and the average width $((W_0-W_1)/2)$ of the side margin portions 12c will be discussed later.

It is preferable that, in the length direction L of the body 11, the maximum length of the end margin portions 12e provided between each of the first and second end surfaces 113 and 114 and the inner layer portion 11m be greater than the height $h_1$ of the first outer layer portion 12b1. It is also preferable that the average length $((L_0-L_1)/2)$ of the end margin portions 12e be greater than the height $h_1$ of the first outer layer portion 12b1. It is more preferable that the maximum length or the average length $((L_0-L_1)/2)$ of the end margin portions 12e be greater than about 30 µm and smaller than about 90 µm, for example. It is also preferable that the maximum length of the end margin portions 12e be greater than the height $h_{21}$ of the inner portion 12b21. The maximum length and the average length $((L_0-L_1)/2)$ of the end margin portions 12e will be discussed later.

Some of the components contained in the capacitor 10 will be described in detail.

As a material for each of the plurality of conductive layers 13, a metal, such as Ni, Cu, Ag, Pd, or Au, or an alloy containing at least one of such metals (for example, an alloy of Ag and Pd) may be used. The thickness of each conductive layer 13 after a firing step is preferably about 0.3 µm to about 2.0 µm, for example.

The two outer electrodes 14 each include a foundation layer which covers both end portions of the body 11 and a plated layer which covers this foundation layer. As a material for the foundation layer, a metal, such as Ni, Cu, Ag, Pd, or Au, or an alloy containing at least one of such metals (for example, an alloy of Ag and Pd) may be used. The thickness of the foundation layer is preferably about 10.0 µm to about 50.0 µm, for example.

The foundation layer may be formed by baking a conductive paste applied to both end portions of the body 11 which has been fired. Alternatively, the foundation layer may be formed by firing, together with the conductive layers 13, a conductive paste applied to both end portions of the body 11 which has not been fired. Alternatively, the foundation layer may be formed by plating both end portions of the body 11 or by curing a resin paste containing conductive particles applied to both end portions of the body 11.

If the foundation layer is made of a resin paste containing conductive particles, it is possible to reduce a load imposed on the body 11 caused by an external stress which is produced when a mounting member having the capacitor 10 mounted thereon is deflected due to an external force and thus to significantly reduce or prevent the occurrence of cracks in the body 11. Accordingly, by forming the second outer layer portion 12b2 thick and then by forming the two outer electrodes 14 having a resin layer containing conductive particles, the occurrence of cracks in the body 11 is further significantly reduced or prevented.

As a material for the plated layer, a metal, such as Sn, Ni, Cu, Ag, Pd, or Au, or an alloy containing at least one of such metals (for example, an alloy of Ag and Pd) may be used.

The plated layer may be constituted by a plurality of layers. In this case, the plated layer is preferably a two-layer structure in which a Sn plated layer is formed on a Ni plated layer. In this case, the Ni plated layer defines and functions as a solder barrier layer, while the Sn plated layer improves solder wettability. The thickness of one plated layer is preferably about 1.0 μm to about 10.0 μm, for example.

The dielectric layers 12 each contain a perovskite compound expressed by $ABO_3$ ("A" contains Ba, and "B" contains Ti and O is oxygen) as a principal component. That is, the plurality of first dielectric layers 12x and the second dielectric layer 12y each contain barium titanate ($BaTiO_3$) as a principal component.

The plurality of dielectric layers 12 each contain Si as a secondary component. Si is contained in the dielectric layers 12 by adding a Si compound, such as glass or $SiO_2$, as a secondary component to a perovskite compound expressed by $ABO_3$ as a principal component. Another compound, such as a Mn compound, an Mg compound, a Co compound, a Ni compound, or a rare earth compound, may be added to a perovskite compound expressed by $ABO_3$.

The composition ratio of Si to Ti of the second dielectric layer 12y defining the outer portion 12b22 is higher than that of the first dielectric layers 12x included in the inner layer portion 11m, the first dielectric layer 12x defining the first outer layer portion 12b1, and the first dielectric layer 12x defining the inner portion 12b21. The composition ratio of Si and other components to Ti may be represented by a molar ratio. The molar ratio of Si to Ti of each of the dielectric layers 12 may be measured by using a wavelength-dispersive X-ray spectrometer (WDX).

The molar ratio of Si to Ti of the second dielectric layer 12y defining the outer portion 12b22 is preferably about 1.3 to 3.0 mol percent (%), for example. If the molar ratio of Si to Ti of the second dielectric layer 12y is lower than about 1.3 mol % or higher than about 3.0 mol %, the reliability of the outer portion 12b22 may be impaired.

The molar ratio of Si to Ti of the second dielectric layer 12y defining the outer portion 12b22 is preferably higher than that of the first dielectric layer 12x forming the inner portion 12b21 by about 0.4 mol % or higher, and more preferably, by about 0.8 mol % or higher, for example.

A portion near the boundary region 12z adjacent to the inner portion 12b21 in the outer portion 12b22 has a higher content of Si than a central region 12m of the outer portion 12b22. A surface layer section 12s of the outer portion 12b22 close to the second main surface 112 also has a higher content of Si than the central region 12m of the outer portion 12b22. The boundary region 12z and the surface layer section 12s of the outer portion 12b22 having a high content ratio of Si may be identified by element mapping created by using a field emission wavelength-dispersive X-ray spectrometer (FE-WDX).

Second Preferred Embodiment

A manufacturing method for a capacitor according to a second preferred embodiment of the present invention will be described below with reference to FIGS. 7 through 10. The manufacturing method of the second preferred embodiment is a method for manufacturing the capacitor 10 discussed in the first preferred embodiment.

Figure 7:
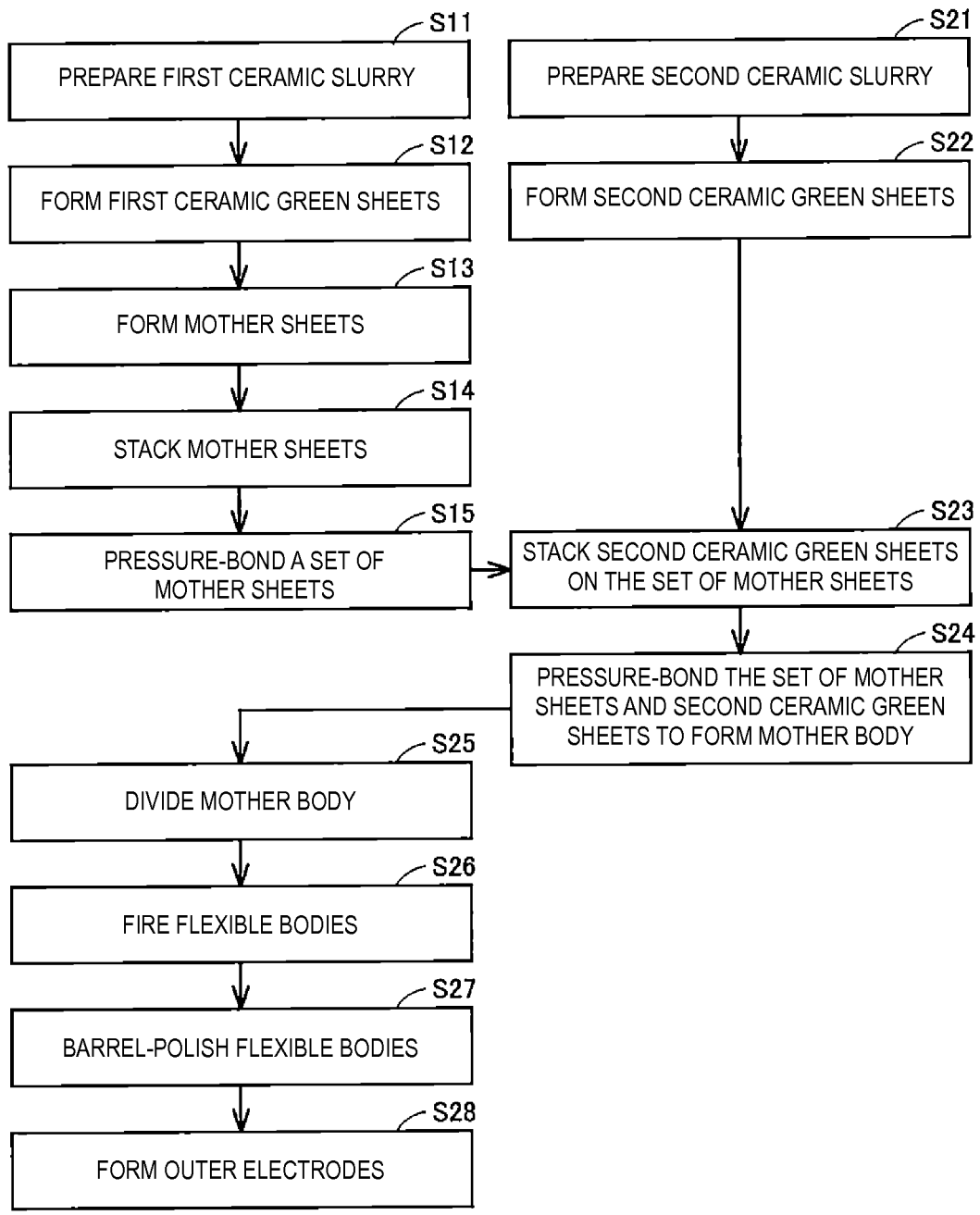
FIG. 7 is a flowchart illustrating a manufacturing method for a multilayer ceramic capacitor according to a second preferred embodiment of the present invention.

FIG. 7 is a flowchart illustrating a manufacturing method for the capacitor 10 in the second preferred embodiment. In this manufacturing method, a plurality of capacitors 10 are mass-produced at one time together in the following manner. Elements which will form a plurality of capacitors 10 are processed together until a halfway point through a manufacturing process so as to fabricate a mother body. Then, the mother body is divided into individual flexible bodies. The individual flexible bodies are then processed, thus manufacturing a plurality of capacitors 10.

The manufacturing method will be discussed below more specifically with reference to FIG. 7. In step S11, first ceramic slurry is prepared first. More specifically, a ceramic powder, a binder, and a solvent are mixed at a predetermined mixing ratio so as to form the first ceramic slurry.

Then, in step S12, first ceramic green sheets are formed. More specifically, the first ceramic slurry is formed into a sheet shape on a carrier film by using a die coater, a gravure coater, or a micro gravure coater, thus defining the first ceramic green sheets.

Then, in step S13, mother sheets are formed. More specifically, a conductive paste is printed on each first ceramic green sheet by using screen printing or gravure printing such that a predetermined conductive pattern is formed on the first ceramic green sheet. As a result, a mother sheet, which is a first ceramic green sheet having a predetermined conductive pattern thereon, is formed.

Figure 8:
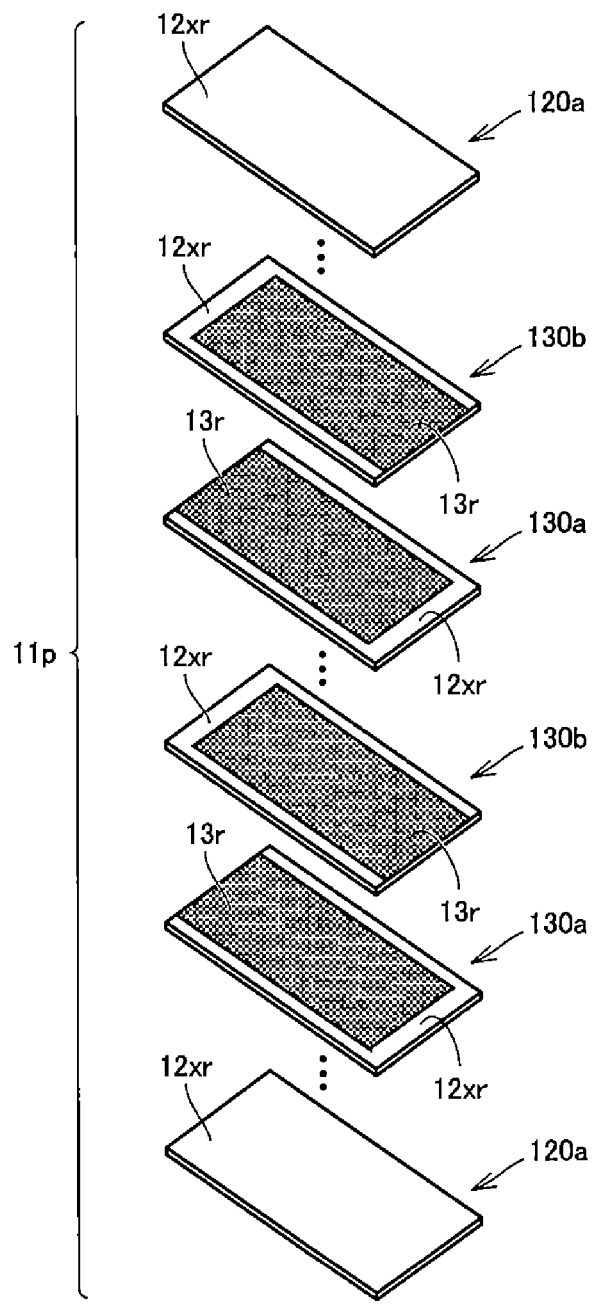
FIG. 8 is an exploded perspective view illustrating the manufacturing method for a multilayer ceramic capacitor according to the second preferred embodiment of the present invention.

Mother sheets formed in step S13 will be discussed below in details. FIG. 8 is an exploded perspective view illustrating the multilayer structure of a set of unit sheets, which will define a partial body 11p of the capacitor 10 of the first preferred embodiment without the outer portion 12b22.

As shown in FIG. 8, the partial body 11p includes a set of a plurality of unit sheets 120a, 130a, and 130b which are configured differently. More specifically, the plurality of unit sheets 120a, 130a, and 130b are stacked on each other in a predetermined order and are then pressure-bonded and fired so as to fabricate the partial body 11p.

Each unit sheet 120a preferably is constituted only by a ceramic base member 12xr on which no conductive pattern is formed. The unit sheet 120a defines a first dielectric layer 12x of the first outer layer portion 12b1 or the inner portion 12b21 after the firing step is performed.

The unit sheets 130a and 130b are each constituted by a ceramic base member 12xr on which a conductive pattern 13r having a predetermined shape is formed. The conductive patterns 13r of the unit sheets 130a and 130b define the conductive layers 13 within the inner layer portion 11m after the firing step is performed. The ceramic base members 12xr of the unit sheets 130a and 130b define the first dielectric layers 12x within the inner layer portion 11m after the firing step is performed.

The layout of the mother sheet is as follows. By using each of the unit sheets 130a and 130b shown in FIG. 8 as a unit, a plurality of unit sheets having the same configuration as that of the unit sheet 130a or 130b are two-dimensionally arranged in a matrix.

Since the unit sheets 130a and 130b have the same configuration, unit sheets having the same conductive pattern may be used as a mother sheet. In a step of stacking a set of mother sheets, which will be discussed later, mother sheets having the same conductive pattern are displaced from each other by a half pitch, thus obtaining the multilayer structure of the unit sheets 130a and 130b shown in FIG. 8.

As mother sheets, not only mother sheets having the conductive pattern 13r, but also first ceramic green sheets which are formed without being subjected to step S13 are also prepared.

Then, referring back to FIG. 7, in step S14, the mother sheets are stacked. More specifically, by stacking the plurality of mother sheets according to a predetermined rule, the above-described units are positioned within a set of the stacked mother sheets so that the multilayer structure shown in FIG. 8 is obtained.

Figure 9:
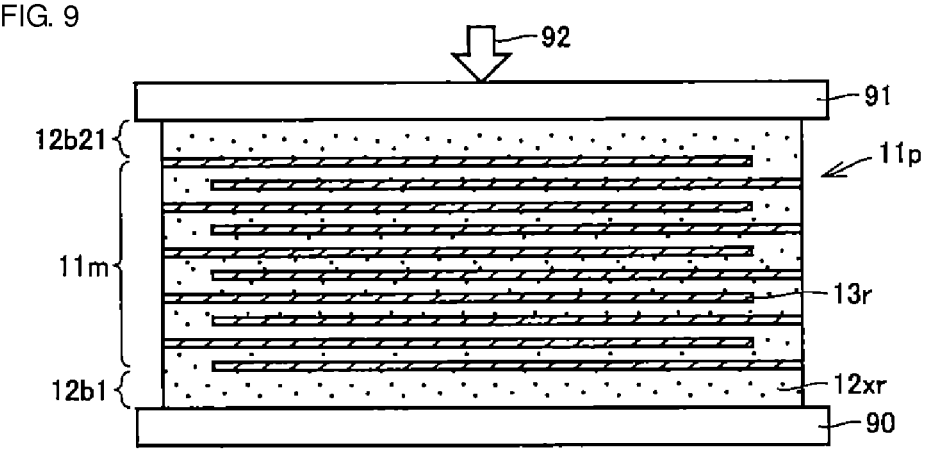
FIGS. 9 and 10 are sectional views illustrating the manufacturing method for a multilayer ceramic capacitor according to the second preferred embodiment of the present invention.

Then, in step S15, the set of stacked mother sheets is pressure-bonded. FIG. 9 is a sectional view illustrating a state in which the set of mother sheets are being pressure-bonded. In FIG. 9, the set of mother sheets corresponding to only one partial body 11p is shown. In the second preferred embodiment, as shown in FIG. 9, a plurality of mother sheets defining the first outer layer portion 12b1, a plurality of mother sheets defining the inner layer portion 11m, and a plurality of mother sheets defining the inner portion 12b21 are stacked on each other in this order so as to define the set of mother sheets.

A flat die 91 is pressed against the mother sheets defining the inner portion 12b21 along the stacking direction, as indicated by an arrow 92 in FIG. 9, thus pressure-bonding the set of mother sheets placed on a base 90.

In step S21, second ceramic slurry is prepared. More specifically, a ceramic powder, a binder, and a solvent are mixed at a predetermined mixing ratio so as to form the second ceramic slurry. The amount of Si contained in the second ceramic slurry is greater than that in the first ceramic slurry.

Then, in step S22, second ceramic green sheets are formed. More specifically, the second ceramic slurry is formed into a sheet shape on a carrier film by using a die coater, a gravure coater, or a micro gravure coater, thus defining a plurality of second ceramic green sheets.

Then, in step S23, the plurality of second ceramic green sheets are stacked on the set of mother sheets pressure-bonded in step S15. More specifically, the plurality of second ceramic green sheets uniquely made of a ceramic base member 12yr defining the second dielectric layer 12y of the outer portion 12b22 are stacked on the mother sheets defining the inner portion 12b21. Instead of stacking the plurality of second ceramic green sheets uniquely made of a ceramic base member 12yr, a paste containing the second ceramic slurry may be applied onto the mother sheets defining the inner portion 12b21.

Figure 10:
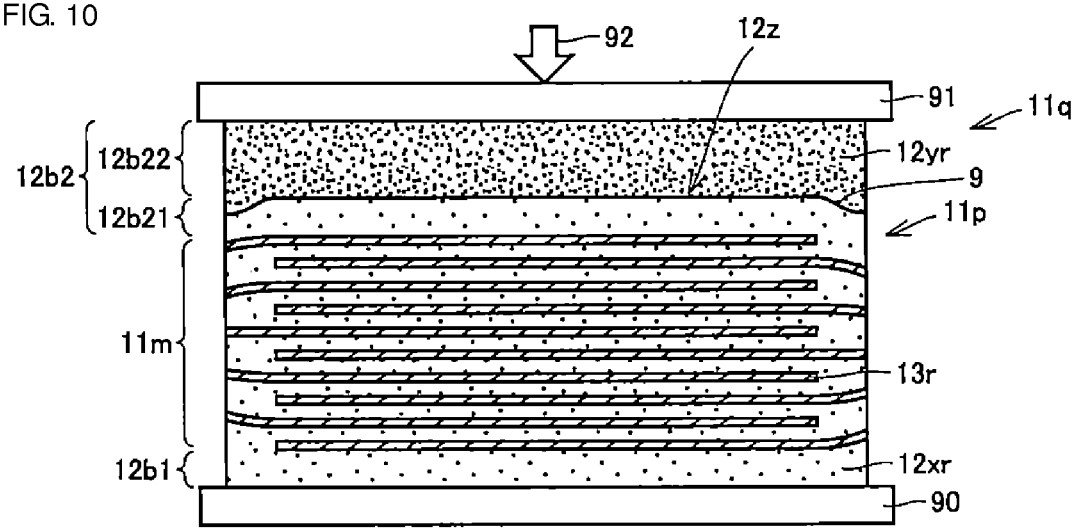

Then, in step S24, the set of mother sheets pressure-bonded in step S15 and the plurality of second ceramic green sheets are pressure-bonded. FIG. 10 is a sectional view illustrating a state in which the set of mother sheets and the plurality of second ceramic green sheets are being pressure-bonded. In FIG. 10, the set of mother sheets and the plurality of second ceramic green sheets corresponding to only one flexible body 11q are shown. In FIG. 10, a flat die 91 is pressed against the mother sheets defining the outer portion 12b22 along the stacking direction of the set of mother sheets, as indicated by an arrow 92, thus pressure-bonding the set of mother sheets and the plurality of second ceramic green sheets. As a result, a mother body is fabricated. At this stage, deformed portions 9 are formed at both ends of the boundary region 12z.

Then, in step S25, the mother body is divided. More specifically, the mother body is press-cut or cut with a dicing machine in a matrix into the flexible bodies 11q.

Then, in step S26, the flexible bodies 11q are fired. More specifically, the flexible bodies 11q are heated to a predetermined temperature so as to fire the ceramic dielectric material and the conductive material. The firing temperature is set suitably in accordance with the type of ceramic dielectric material and the type of conductive material, and may be set within a range of about 900° C. to about 1300° C., for example.

Then, in step S27, the flexible bodies 11q are barrel-polished. More specifically, the flexible bodies 11q subjected to firing are sealed within a small box called a barrel, together with media balls having a higher hardness than the ceramic material. Then, by rotating the barrel, the flexible bodies 11q are polished. By performing this barrel-polishing, the outer surfaces (in particular, corners and ridges) of the flexible bodies 11q are curved and rounded. As a result, the body 11 is formed.

Then, in step S28, outer electrodes are formed. More specifically, a conductive paste is applied to an end portion including the first end surface 113 and an end portion including the second end surface 114 of the body 11 so as to form a metal film, and then, the metal film is fired. Then, the metal film is sequentially Ni-plated and Sn-plated. As a result, the two outer electrodes 14 are formed on the outer surfaces of the body 11.

In the second preferred embodiment, through the above-described series of steps, the capacitor 10 configured as shown in FIGS. 1 through 5 is manufactured.

In the capacitor 10 discussed in the first and second preferred embodiments, each of the plurality of dielectric layers 12 preferably contains barium titanate as a principal component and Si as a secondary component. The molar ratio of Si to Ti of the dielectric layer 12 defining the outer portion 12b22 is preferably higher than that of the dielectric layers 12 included in the inner layer portion 11m and the dielectric layer 12 defining the inner portion 12b21. It is preferable that the boundary region in the outer portion 12b22 have a higher content of Si than the central region 12m of the outer portion 12b22 since Si moves from the outer portion 12b22 or the inner portion 12b21 to this boundary region.

The two outer electrodes 14 are preferably disposed on at least a portion of the second main surface 112 of the body 11. The surface layer section 12s of the outer portion 12b22 close to the second main surface 112 preferably has a higher content of Si than the central region 12m of the outer portion 12b22.

The composition ratio of a rare earth element to Ti of the dielectric layers included in the inner layer portion 11m is preferably higher than that of the dielectric layer forming the outer portion 12b22.

The composition ratio of Mn to Ti of the dielectric layers included in the inner layer portion 11m, the dielectric layer defining the first outer layer portion 12b1, and the dielectric layer defining the inner portion 12b21 is preferably higher than that of the dielectric layer defining the outer portion 12b22.

In the capacitor 10, the molar ratio of Si to Ti of the second dielectric layer 12y defining the outer portion 12b22 is higher than that of the first dielectric layers 12x included in the inner layer portion 11m and the first dielectric layer 12x defining the inner portion 12b21. That is, the outer portion 12b22 has a higher content of Si than the inner portion 12b21. In a firing step, the coefficient of thermal contraction of a dielectric layer having a higher content of Si is higher. Accordingly, in the firing step, the coefficient of thermal contraction of the outer portion 12b22 is higher than that of the inner portion 12b21. Thus, the coefficient of thermal contraction of the outer portion 12b22 is closer to that of the conductive layers 13 of the inner layer portion 11m.

In the capacitor 10, it is possible to reduce an internal stress which is produced in the firing step due to the difference in the coefficient of thermal contraction between the dielectric layers and the conductive layers and which acts on the boundary between the inner layer portion 11m and the second outer layer portion 12b2. Thus, the occurrence of cracks (delamination) at the boundary between the inner layer portion 11m and the second outer layer portion 12b2 is significantly reduced or prevented.

The molar ratio of Si to Ti of the second dielectric layer 12y defining the outer portion 12b22 is higher than that of the first dielectric layer 12x defining the inner portion 12b21 by about 0.4 mol % or higher, for example. With this configuration, the occurrence of cracks (delamination) at the boundary between the inner layer portion 11m and the second outer layer portion 12b2 is effectively significantly reduced or prevented. The molar ratio of Si to Ti of the outer portion 12b22 is higher than that of the inner portion 12b21 by about 0.8 mol % or higher, for example. With this configuration, the occurrence of cracks at the boundary between the inner layer portion 11m and the second outer layer portion 12b2 is significantly reduced or prevented even more effectively.

As described above, the height of the outer portion 12b22 is equal to or greater than that of the inner portion 12b21. With this configuration, the stress relaxing effect exhibited by the thermal contraction of the outer portion 12b22 is more likely to be produced at the boundary between the inner layer portion 11m and the second outer layer portion 12b2.

The height $h_{22}$ of the outer portion 12b22 preferably is about 30 μm or greater, for example. With this configuration, it is possible to secure a sufficient contraction force which acts on the inner portion 12b21 by the thermal contraction of the outer portion 12b22.

The height $h_{21}$ of the inner portion 12b21 preferably is about 20 μm or greater, for example. With this configuration, the diffusion of Si contained in the outer portion 12b22 into the inner layer portion 11m is significantly reduced or prevented. If the content ratio of Si in the inner layer portion 11m becomes too high, the grain growth of ceramic particles in the first dielectric layers 12x included in the inner layer portion 11m accelerates excessively in the firing step, thus reducing the withstand voltage characteristics of the first dielectric layers 12x. As a result, the inner layer portion 11m is more likely to be short-circuited. However, by setting the height $h_{21}$ of the inner portion 12b21 to be about 20 μm or greater, for example, the withstand voltage characteristics of the first dielectric layers 12x included in the inner layer portion 11m can be maintained, and thus, the occurrence of short-circuiting of the inner layer portion 11m is significantly reduced or prevented.

As described above, the height $h_{21}$ of the inner portion 12b21 is greater than the height $h_1$ of the first outer layer portion 12b1. The adhesion force between the outer portion 12b22 and the inner portion 12b21 is increased because of the configuration of the boundary therebetween, which will be discussed later. Accordingly, even if the inner portion 12b21 is made to be thick to a certain degree, the occurrence of cracks (delamination) at the boundary between the outer portion 12b22 and the inner portion 12b21 is significantly reduced or prevented. Thus, a contraction force generated by the thermal contraction of the outer portion 12b22 acts on the inner portion 12b21. It is therefore possible to reduce an internal stress which is produced during the firing step due to the difference in the coefficient of thermal contraction between the dielectric layers and the conductive layers and which acts on the boundary between the inner layer portion 11m and the inner portion 12b21. Thus, the occurrence of cracks (delamination) at the boundary between the inner layer portion 11m and the second outer layer portion 12b2 is significantly reduced or prevented.

As described above, the maximum width of the side margin portions 12c is preferably greater than the height $h_1$ of the first outer layer portion 12b1. If the first outer layer portion 12b1 is thin, it is possible to reduce an internal stress which is produced during the firing step due to the difference in the coefficient of thermal contraction between the dielectric layers and the conductive layers and which acts on the boundary between the inner layer portion 11m and the first outer layer portion 12b1. Thus, the occurrence of cracks (delamination) at the boundary between the inner layer portion 11m and the first outer layer portion 12b1 is significantly reduced or prevented.

If the maximum width of the side margin portions 12c is set to be large, when pressure-bonding a set of mother sheets, the pressure is more likely to be applied to the plurality of first dielectric layers 12x positioned in the side margin portions 12c, thus enhancing the adherence of the first dielectric layers 12x in the side margin portions 12c. As a result, it is possible to significantly reduce or prevent the occurrence of cracks (delamination) in the first dielectric layers 12x positioned in the side margin portions 12c.

As described above, the average width $((W_0-W_1)/2)$ of the side margin portions 12c is preferably greater than the height $h_1$ of the first outer layer portion 12b1. The half of the total width of the two adjacent side margin portions 12c of two adjacent bodies 11 divided from the mother body corresponds to the average width $((W_0-W_1)/2)$. Accordingly, if the average width $((W_0-W_1)/2)$ of the side margin portions 12c is set to be greater than the height $h_1$ of the first outer layer portion 12b1, when pressure-bonding a set of mother sheets, the pressure is more likely to be applied to the plurality of first dielectric layers 12x positioned in the side margin portions 12c, thus enhancing the adherence of the first dielectric layers 12x positioned in the side margin portions 12c. As a result, it is possible to significantly reduce or prevent the occurrence of cracks (delamination) in the first dielectric layers 12x positioned in the side margin portions 12c. That is, even if there is a difference between the width of the side margin portion 12c close to the first side surface 115 and that close to the second side surface 116, both of the effect of significantly reducing or preventing the occurrence of cracks (delamination) and the effect of significantly reducing or preventing the occurrence of short-circuiting in the inner layer portion 11m are reliably achieved.

As described above, the maximum width of the side margin portions 12c is preferably greater than the height $h_{21}$ of the inner portion 12b21. If the inner portion 12b21 is thin, a contraction force exhibited by the thermal contraction of the outer portion 12b22 is likely to act on the inner portion 12b21. It is thus possible to effectively reduce an internal stress which is produced during the firing step due to the difference in the coefficient of thermal contraction between the dielectric layers and the conductive layers and which acts on the boundary between the inner layer portion 11m and the inner portion 12b21. As a result, the occurrence of cracks (delamination) at the boundary between the inner layer portion 11m and the second outer layer portion 12b2 is significantly reduced or prevented.

As described above, the maximum width or the average width $((W_0-W_1)/2)$ of the side margin portions 12c is more preferably greater than about 30 μm and smaller than about 90 μm, for example. If the maximum width or the average width $((W_0-W_1)/2)$ of the side margin portions 12c is greater than about 30 μm, for example, the occurrence of cracks (delamination) at the boundary between the inner layer portion 11m and the inner portion 12b21 is reliably significantly reduced or prevented. If the maximum width or the average width $((W_0-W_1)/2)$ of the side margin portions 12c is equal to or greater than about 90 μm, the electrostatic capacitance of the capacitor 10 becomes too small. That is, by setting the maximum width or the average width $((W_0-W_1)/2)$ of the side margin portions 12c to be smaller than about 90 μm, for example, a sufficient electrostatic capacitance of the capacitor 10 can be secured.

As described above, the height $T_1$ of the inner layer portion 11m in the stacking direction of the body 11 is greater than the width $W_1$ of the inner layer portion 11m where the plurality of conductive layers 13 are positioned in the width direction W of the body 11. The height $T_1$ of the inner layer portion 11m may be greater than the width $W_0$ of the body 11.

The adhesion force between the outer portion 12b22 and the inner portion 12b21 is increased because of the configuration of the boundary therebetween, which will be discussed later. Accordingly, even if the adherence between the first dielectric layers 12x positioned in the side margin portions 12c is decreased due to a large height of the inner layer portion 11m, the occurrence of cracks (delamination) at the boundary between the outer portion 12b22 and the inner portion 12b21 is significantly reduced or prevented. Thus, a contraction force generated by the thermal contraction of the outer portion 12b22 acts on the inner portion 12b21. It is therefore possible to reduce an internal stress which is produced during the firing step due to the difference in the coefficient of thermal contraction between the dielectric layers and the conductive layers and which acts on the boundary between the inner layer portion 11m and the inner portion 12b21. As a result, the occurrence of cracks (delamination) at the boundary between the inner layer portion 11m and the inner portion 12b21 is significantly reduced or prevented.

As described above, the maximum length of the end margin portions 12e in the length direction L is preferably greater than the height $h_1$ of the first outer layer portion 12b1. If the first outer layer portion 12b1 is thin, it is possible to reduce an internal stress which is produced during the firing step due to the difference in the coefficient of thermal contraction between the dielectric layers and the conductive layers and which acts on the boundary between the inner layer portion 11m and the first outer layer portion 12b1. Thus, the occurrence of cracks (delamination) at the boundary between the inner layer portion 11m and the first outer layer portion 12b1 is significantly reduced or prevented.

If the maximum length of the end margin portions 12e is set to be large, when pressure-bonding a set of mother sheets, the pressure is more likely to be applied to the plurality of first dielectric layers 12x positioned in the end margin portions 12e, thus enhancing the adherence of the first dielectric layers 12x in the end margin portions 12e. As a result, it is possible to significantly reduce or prevent the occurrence of cracks (delamination) in the first dielectric layers 12x positioned in the end margin portions 12e.

As described above, the average length $((L_0-L_1)/2)$ of the end margin portions 12e is preferably greater than the height $h_1$ of the first outer layer portion 12b1. The half of the total length of the two adjacent end margin portions 12e of two adjacent bodies 11 divided from the mother body corresponds to the average length $((L_0-L_1)/2)$. Accordingly, if the average length $((L_0-L_1)/2)$ of the end margin portions 12e is set to be greater than the height $h_1$ of the first outer layer portion 12b1, when pressure-bonding a set of mother sheets, the pressure is more likely to be applied to the plurality of first dielectric layers 12x positioned in the end margin portions 12e, thus enhancing the adherence of the first dielectric layers 12x in the end margin portions 12e. As a result, it is possible to significantly reduce or prevent the occurrence of cracks (delamination) in the first dielectric layers 12x positioned in the end margin portions 12e. That is, even if there is a difference between the length of the end margin portion 12e close to the first end surface 113 and that close to the second end surface 114, both of the effect of significantly reducing or preventing the occurrence of cracks (delamination) and the effect of significantly reducing or preventing the occurrence of short-circuiting in the inner layer portion 11m are reliably achieved.

As described above, the maximum length of the end margin portions 12e is preferably greater than the height $h_{21}$ of the inner portion 12b21. If the inner portion 12b21 is thin, a contraction force exhibited by the thermal contraction of the outer portion 12b22 is likely to act on the inner portion 12b21. It is thus possible to effectively reduce an internal stress which is produced during the firing step due to the difference in the coefficient of thermal contraction between the dielectric layers and the conductive layers and which acts on the boundary between the inner layer portion 11m and the inner portion 12b21. As a result, the occurrence of cracks (delamination) at the boundary between the inner layer portion 11m and the second outer layer portion 12b2 is significantly reduced or prevented.

As described above, the maximum length or the average length $((L_0-L_1)/2)$ of the end margin portions 12e is more preferably greater than about 30 μm and smaller than about 90 μm, for example. If the maximum length or the average length $((L_0-L_1)/2)$ of the end margin portions 12e is greater than about 30 μm, for example, the occurrence of cracks (delamination) at the boundary between the inner layer portion 11m and the inner portion 12b21 can be stably significantly reduced or prevented. If the maximum length or the average length $((L_0-L_1)/2)$ of the end margin portions 12e is equal to or greater than about 90 μm, the electrostatic capacitance of the capacitor 10 becomes too small. That is, by setting the maximum length or the average length $((L_0-L_1)/2)$ of the end margin portions 12e to be smaller than about 90 μm, for example, a sufficient electrostatic capacitance of the capacitor 10 is secured.

As described above, the height $T_1$ of the inner layer portion 11m in the stacking direction of the body 11 is greater than the length $L_1$ of the inner layer portion 11m where the plurality of conductive layers 13 are positioned in the length direction L of the body 11. The height $T_1$ of the inner layer portion 11m may be greater than the length $L_0$ of the body 11.

The adhesion force between the outer portion 12b22 and the inner portion 12b21 is increased because of the configuration of the boundary therebetween, which will be discussed later. Accordingly, even if the adherence between the first dielectric layers 12x positioned in the end margin portions 12e is decreased due to a large height of the inner layer portion 11m, the occurrence of cracks (delamination) at the boundary between the outer portion 12b22 and the inner portion 12b21 is significantly reduced or prevented. Thus, a contraction force generated by the thermal contraction of the outer portion 12b22 acts on the inner portion 12b21. It is therefore possible to reduce an internal stress which is produced during the firing step due to the difference in the coefficient of thermal contraction between the dielectric layers and the conductive layers and which acts on the boundary between the inner layer portion 11m and the inner portion 12b21. As a result, the occurrence of cracks (delamination) at the boundary between the inner layer portion 11m and the inner portion 12b21 is significantly reduced or prevented.

As described above, since each of the plurality of first dielectric layers 12x and the second dielectric layer 12y contains barium titanate as a principal component, chemical bonding at the interface between the inner portion 12b21 and the outer portion 12b22 is strengthened, thus enhancing the adherence therebetween. As a result, it is possible to significantly reduce or prevent the occurrence of cracks (delamination) at the boundary between the inner portion 12b21 and the outer portion 12b22.

As described above, the boundary region in the outer portion 12b22 has a higher content of Si than the central region 12m of the outer portion 12b22. The surface layer section 12s of the outer portion 12b22 close to the second main surface 112 also has a higher content of Si than the central region 12m of the outer portion 12b22.

A description will be given below of how to set the content ratio of Si of the boundary region in the outer portion 12b22 and the surface layer section 12s of the outer portion 12b22 to be higher than that of the central region 12m of the outer portion 12b22. The firing step for the capacitor 10 is performed at a temperature and in a gaseous atmosphere in which Si segregates from grain boundaries of ceramic particles. Then, in the outer portion 12b22 containing a greater amount of Si, the grain growth of ceramic particles is encouraged, and Si segregates from the grain boundaries of coarsened ceramic particles. Segregated Si moves along the grain boundaries of the ceramic particles and concentrates toward the boundary in the outer portion 12b22 and the surface layer section 12s of the outer portion 12b22. As a result, the content ratio of Si of the boundary region and that of the surface layer section 12s of the outer portion 12b22 become higher than that of the central region 12m of the outer portion 12b22.

The content ratio of Si of the boundary region in the outer portion 12b22 is higher than that of the central region 12m of the outer portion 12b22, thus improving the adhesion force between the outer portion 12b22 and the inner portion 12b21. The reason for this may be as follows. Si which has moved along the grain boundaries of the ceramic particles as described above fills many small gaps at the interface between the outer portion 12b22 and the inner portion 12b21 so as to bond them each other. Accordingly, by separately forming the outer portion 12b22 and the inner portion 12b21, small gaps are created at the interface between the outer portion 12b22 and the inner portion 12b21. This encourages the concentration of segregated Si in the boundary region, thus improving the adhesion force between the outer portion 12b22 and the inner portion 12b21.

The content ratio of Si of the surface layer section 12s of the outer portion 12b22 close to the second main surface 112 is higher than that of the central region 12m of the outer portion 12b22, thus significantly reducing or preventing a decrease in the mechanical strength of the body 11 when forming the outer electrodes 14. The reason for this is as follows. In the formation of the outer electrodes 14, if glass components contained in the outer electrodes 14 react with the ceramic dielectric material of the body 11, the mechanical strength of the body 11 is decreased. In this case, if an external force is applied to the capacitor 10 while the capacitor 10 is being mounted or after it has been mounted, cracks are likely to occur in the body 11 starting from the end of the contact area with the outer electrode 14 close to the center of the body 11. However, if the content ratio of Si of the outer portion 12b22 is high, the reaction of glass components contained in the outer electrodes 14 with the ceramic dielectric material of the body 11 is significantly reduced or prevented. As a result, it is possible to significantly reduce or prevent a decrease in the mechanical strength of the body 11 when forming the outer electrodes 14.

In each of the plurality of dielectric layers 12, if a rare earth compound is contained in a perovskite compound expressed by $ABO_3$, which is a principal component, the molar ratio of a rare earth element to Ti of the first dielectric layers 12x included in the inner layer portion 11m and the first dielectric layer 12x defining the inner portion 12b21 is preferably higher than that of the second dielectric layer 12y forming the outer portion 12b22. That is, the inner layer portion 11m and the inner portion 12b21 preferably contain a greater amount of rare earth element than the outer portion 12b22.

As a rare earth element, Dy, Gd, Y, or La may be added to improve the functions of the capacitor 10. More specifically, by adding a rare earth element, it is possible to stabilize the capacitance temperature characteristics and to prolong the life of the capacitor 10 by maintaining the insulation resistance (IR) value even under a high-temperature load.

A rare earth element is likely to concentrate in a grain boundary of ceramic particles or a segregation layer and also to elute to water-soluble flux. Accordingly, ceramic components containing a rare earth element may elute to an organic acid, such as adipic acid, contained in water-soluble flux used for soldering when mounting the capacitor 10. In this case, cracks may occur in the outer layer portion 12b2 of the body 11 which is embrittled as a result of the eluting of ceramic components.

Accordingly, the molar ratio of a rare earth element to Ti of the first dielectric layers 12x included in the inner layer portion 11m and the first dielectric layer 12x forming the inner portion 12b21 is preferably about 0.3 mol % or higher, and the molar ratio of a rare earth element to Ti of the second dielectric layer 12y forming the outer portion 12b22 is preferably lower than about 0.3 mol %, for example.

By setting the molar ratio of a rare earth element to Ti of the first dielectric layers 12x included in the inner layer portion 11m to be about 0.3 mol % or higher, for example, it is possible to stabilize the capacitance temperature characteristics and to prolong the life of the capacitor 10 by maintaining the insulation resistance (IR) value even under a high-temperature load.

By setting the molar ratio of a rare earth element to Ti of the second dielectric layer 12y forming the outer portion 12b22 to be lower than about 0.3 mol %, for example, it is possible to significantly reduce or prevent the occurrence of cracks in the outer portion 12b22 caused by the embrittlement of the outer portion 12b22 as a result of the eluting of ceramic components from the outer portion 12b22. These features and advantages have been validated, as a result of conducting experiments by changing the content of Dy used as a rare earth element. Advantages obtained by the use of Gd, Y, or La instead of Dy have also been validated.

In each of the plurality of dielectric layers 12, if a Mn compound is contained in a perovskite compound expressed by $ABO_3$, which is a principal component, the molar ratio of a Mn compound to Ti of the first dielectric layers 12x included in the inner layer portion 11m, the first dielectric layer 12x defining the first outer layer portion 12b1, and the first dielectric layer 12x defining the inner portion 12b21 is preferably higher than that of the second dielectric layer 12y forming the outer portion 12b22. That is, the inner layer portion 11m and the inner portion 12b21 preferably contain a greater amount of Mn than the outer portion 12b22.

The color of a ceramic dielectric layer containing a smaller amount of Mn is brighter than that containing a greater amount of Mn. Accordingly, the color of the outer portion 12b22 is brighter than that of the inner layer portion 11m, the first outer layer portion 12b1, and the inner portion 12b21, which contain a greater amount of Mn. It is thus easy to visually distinguish the first and second main surfaces 111 and 112 of the capacitor 10 from each other.

When observing the capacitor 10 with an imaging camera, the orientations of the first and second main surfaces 111 and 112 of the capacitor 10 can be identified. Thus, when mounting the capacitor 10, the orientation of the capacitor 10 can be automatically set so that the second main surface 112 will be a mounting surface.

For example, the molar ratio of Mn to Ti of the first dielectric layers 12x included in the inner layer portion 11m, the first dielectric layer 12x defining the first outer layer portion 12b1, and the first dielectric layer 12x defining the inner portion 12b21 is preferably about 0.08 mol % or higher, and the molar ratio of Mn to Ti of the second dielectric layer 12y forming the outer portion 12b22 is preferably lower than about 0.08 mol %, for example. These features and advantages have been validated as a result of conducting experiments by changing the content of Mn.

Third Preferred Embodiment

A capacitor mount body according to a third preferred embodiment of the present invention will be described below with reference to FIG. 11.

Figure 11:
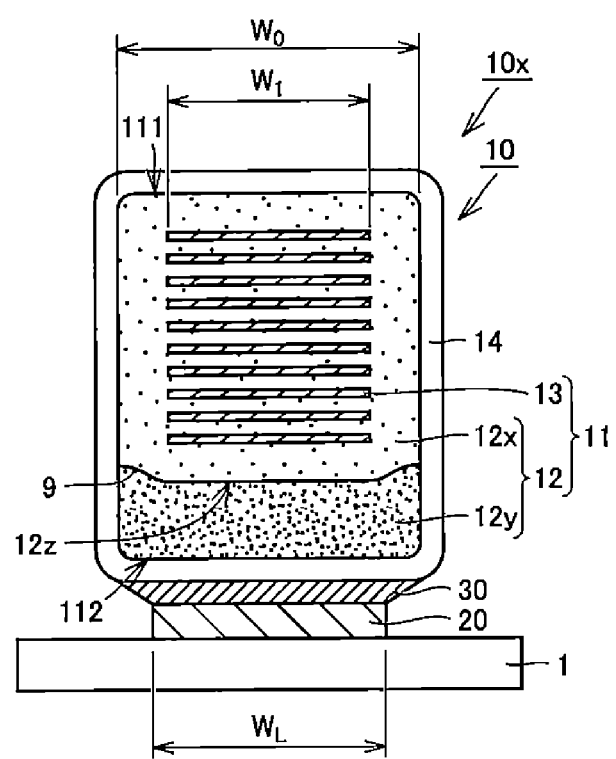
FIG. 11 is a sectional view illustrating a multilayer ceramic capacitor mount body according to a third preferred embodiment of the present invention.

FIG. 11 is a sectional view illustrating a capacitor mount body 10x of the third preferred embodiment. The capacitor mount body 10x includes the capacitor 10 and a mounting member 1 used to mount the capacitor 10 thereon. The capacitor 10 is mounted on the mounting member 1 such that the second main surface 112 faces the mounting member 1. The mounting member 1 may be a circuit board, for example.

The configuration of the capacitor mount body 10x will be discussed more specifically. A pair of lands 20 is disposed on the surface of the mounting member 1 such that the lands 20 are spaced apart from each other. The two outer electrodes 14 of the capacitor 10 and the two lands 20 are electrically connected to each other by solder 30, which is a bonding medium. The bonding medium is not restricted to solder, and any bonding material may be used as long as it is able to mechanically and electrically connect the two outer electrodes 14 and the two lands 20. In FIG. 11, the two lands 20 are disposed side by side in a direction perpendicular to the plane of the drawing. In FIG. 11, only one land 20 at the near side is shown, and the land 20 at the far side is hidden by the land 20 at the near side.

A width $W_L$ of the two lands 20 is smaller than the width $W_0$ of the body 11. With this configuration, the two outer electrodes 14 are subjected to a compressive stress applied from the solder 30 in the width direction W of the body 11. This compressive stress further acts on the inner portion 12b21 via the outer portion 12b22. Accordingly, the internal stress acting on the boundary between the inner layer portion 11m and the second outer layer portion 12b2 is relaxed, thus significantly reducing or preventing the occurrence of cracks (delamination) at this boundary.

The width $W_L$ of the two lands 20 is preferably smaller than the width $W_1$ of the inner layer portion 11m. In this case, the compressive stress acting on the inner portion 12b21 via the outer portion 12b22 is increased. Accordingly, the internal stress acting on the boundary between the inner layer portion 11m and the second outer layer portion 12b2 is further relaxed, thus further significantly reducing or preventing the occurrence of cracks (delamination) at this boundary.

Fourth Preferred Embodiment

A capacitor mount series according to a fourth preferred embodiment of the present invention will be described below with reference to FIGS. 12 and 13.

Figure 12:
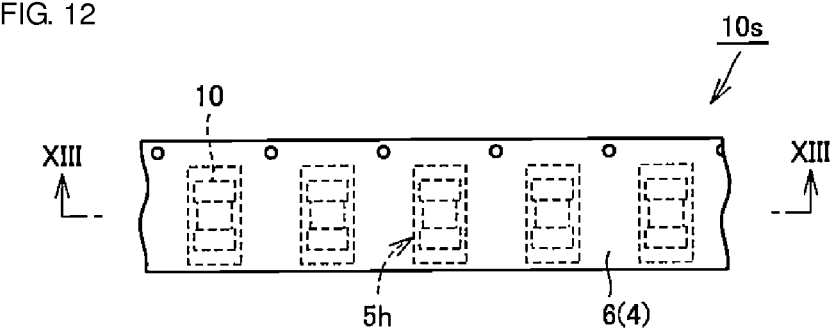
FIG. 12 is a plan view of a multilayer ceramic capacitor series according to a fourth preferred embodiment of the present invention.
Figure 13:
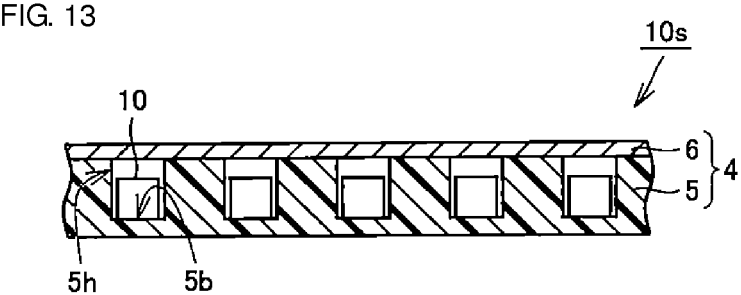
FIG. 13 is a sectional view taken along line XIII-XIII of FIG. 12.

FIG. 12 is a plan view of a capacitor mount series 10s of the fourth preferred embodiment. FIG. 13 is a sectional view taken along line XIII-XIII of FIG. 12.

The capacitor mount series 10s includes a plurality of capacitors 10 and a package 4. The package 4 includes an elongated carrier tape 5 and a cover tape 6. The carrier tape 5 includes a plurality of cavities 5h spaced apart from each other and storing the plurality of capacitors 10 therein. The cover tape 6 is attached to the carrier tape 5 so as to cover the plurality of cavities 5h. The plurality of capacitors 10 are stored in the respective cavities 5h such that the second main surfaces 112 face bottom sides 5b of the respective cavities 5h.

The plurality of capacitors 10 included in the capacitor series 10s are extracted from the package 4 one by one and are mounted on the mounting member 1. More specifically, in the state in which the cover tape 6 is removed from the carrier tape 5, by sucking and holding the capacitors 10 at the side of the first main surfaces 111, the capacitors 10 are removed from the carrier tape 5 one by one and are mounted on the mounting member 1. As a result, the capacitors 10 are mounted on the mounting member 1 with the second main surfaces 112 facing the mounting member 1.

That is, by using the capacitor series 10s of the fourth preferred embodiment, it is possible to easily manufacture the capacitor mount body 10x of the third preferred embodiment.

Fifth Preferred Embodiment

A manufacturing method for a capacitor according to a fifth preferred embodiment of the present invention will be described below with reference to FIGS. 14 through 16. In the fifth preferred embodiment, a process for forming the deformed portions 9 will be discussed in detail, which is part of the manufacturing method for the capacitor 10 of the second preferred embodiment.

The configuration of the boundary region of the outer portion 12b22 with the inner portion 12b21 of the body 11 of the capacitor 10 is implemented by a pressure-bonding method for a set of mother sheets. Accordingly, the pressure-bonding method for a set of mother sheets in the fifth preferred embodiment will first be described below.

Figure 14:
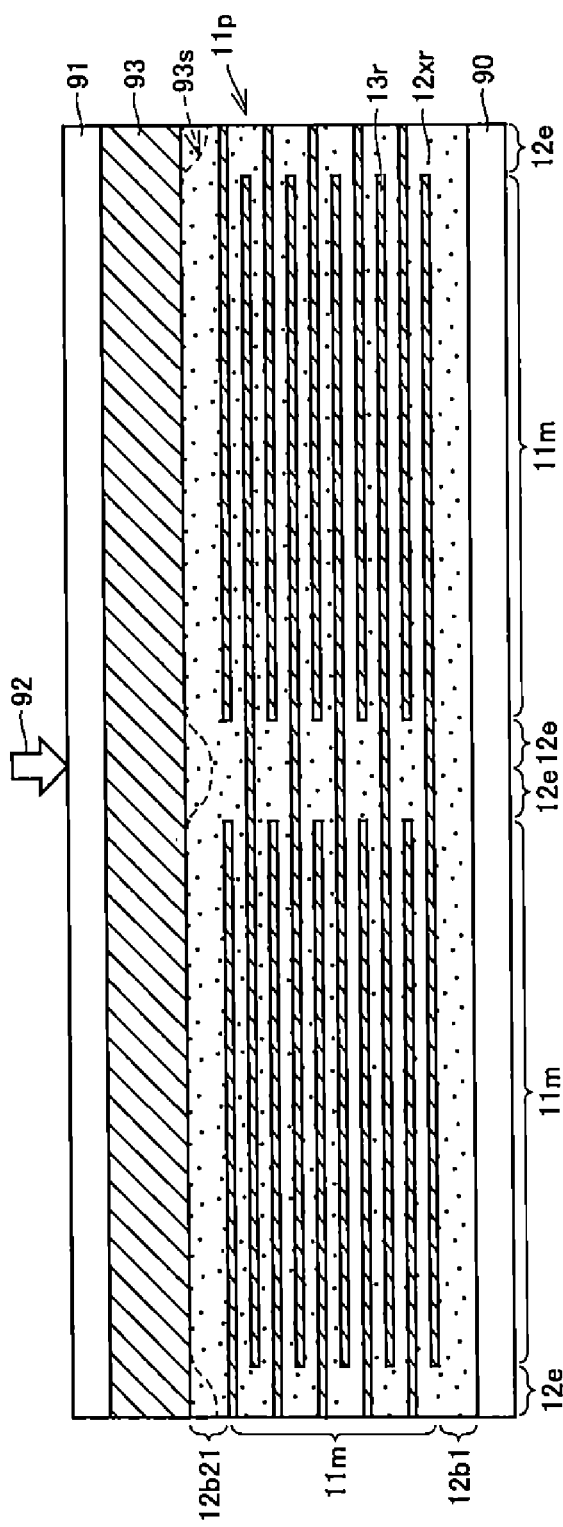
FIGS. 14 through 16 are sectional views illustrating a manufacturing method for a multilayer ceramic capacitor according to a fifth preferred embodiment of the present invention.

FIG. 14 is a sectional view illustrating a state in which a set of mother sheets forming the capacitor 10 in the fifth preferred embodiment are being pressure-bonded. The set of mother sheets shown in FIG. 14 is that as viewed from the same cross section as that shown in FIG. 9. In FIG. 14, the set of mother sheets corresponding to only two partial bodies 11p is shown.

As shown in FIG. 14, in the fifth preferred embodiment, a plurality of mother sheets defining the first outer layer portion 12b1, a plurality of mother sheets defining the inner layer portion 11m, and a plurality of mother sheets defining the inner portion 12b21 are stacked on each other in this order so as to provide a set of mother sheets.

A flat die 91 and a rubber 93 attached to the bottom surface of the flat die 91 are pressed against the mother sheets defining the inner portion 12b21 along the stacking direction, as indicated by an arrow 92 in FIG. 14, thus pressure-bonding the set of mother sheets placed on a base 90.

In the set of mother sheets, the stacking density of the mother sheets defining the inner layer portion 11m is higher than that of the mother sheets defining the side margin portions 12c. Accordingly, as indicated by the dotted lines 93s in FIG. 14, the rubber 93 pressed against the set of mother sheets is deformed and projected downward from positions corresponding to the inner layer portion 11m toward positions corresponding to the end margin portions 12e. This causes the mother sheets at the positions corresponding to the end margin portions 12e to be pressure-bonded to each other and to adhere to each other.

Figure 15:
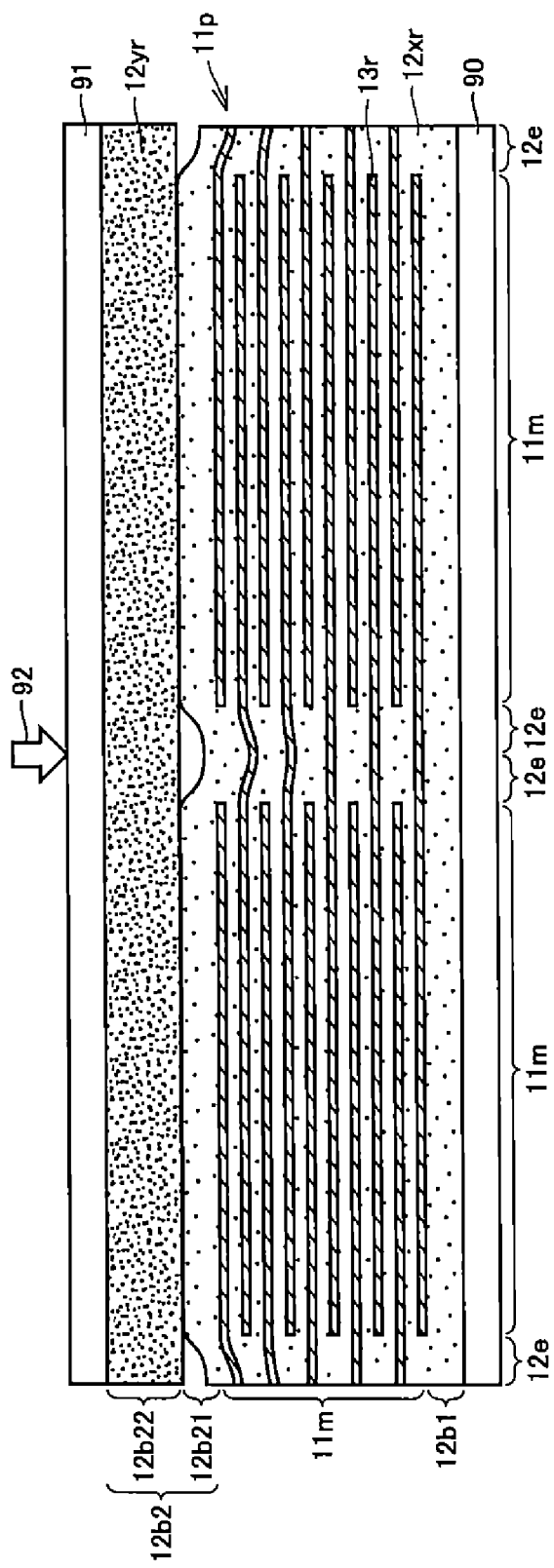

FIG. 15 is a sectional view illustrating a state in which the set of pressure-bonded mother sheets and a plurality of second ceramic green sheets are being pressure-bonded. In FIG. 15, the set of mother sheets corresponding to only two partial bodies 11q is shown. The flat die 91 is pressed against the mother sheets forming the outer portion 12b22 along the stacking direction, as indicated by the arrow 92, thus pressure-bonding the set of mother sheets and the plurality of second ceramic green sheets. As a result, a mother body is fabricated.

Figure 16:
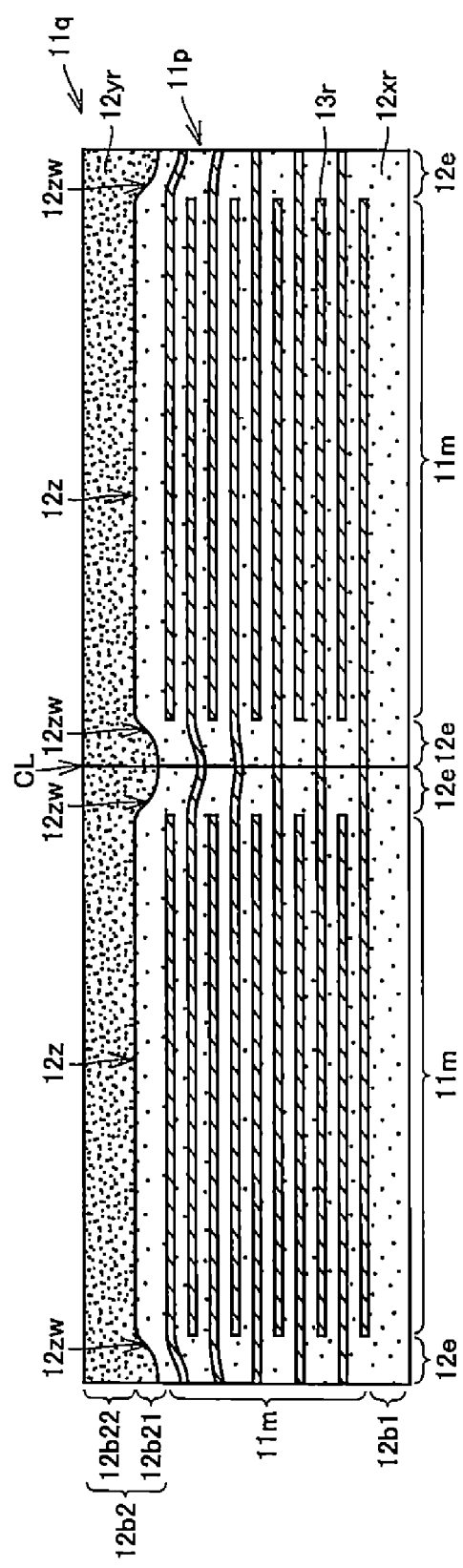

FIG. 16 is a sectional view illustrating a state in which the mother body is divided. In FIG. 16, the mother body corresponding to only two partial bodies 11q is shown. As shown in FIG. 16, the second ceramic green sheets are deformed from positions corresponding to the inner layer portion 11m toward positions corresponding to the end margin portions 12e in accordance with the configuration of the top surface of the set of pressure-bonded mother sheets, and are projected downward at the positions corresponding to the end margin portions 12e.

Accordingly, in the width direction W of the body 11, the boundary region 12z includes deformed portions 12zw projecting downward at the positions corresponding to the end margin portions 12e.

By dividing the mother body on a cut line CL, a plurality of flexible bodies 11q are obtained. The subsequent steps are similar to those of the manufacturing method discussed in the second preferred embodiment.

In the capacitor of the fifth preferred embodiment, the adherence between the first dielectric layers 12x positioned in the end margin portions 12e is enhanced. As a result, it is possible to significantly reduce or prevent the occurrence of cracks (delamination) in the first dielectric layers 12x positioned in the end margin portions 12e.

In the length direction L of the body 11, the boundary region includes deformed portions 12zw projecting downward at the positions corresponding to the end margin portions 12e. With this configuration, the outer portion 12b22 clamps the inner portion 12b21 therebetween via the two deformed portions 12zw. Accordingly, a contraction force exhibited by the thermal contraction of the outer portion 12b22 is effectively applied to the inner portion 12b21. It is thus possible to effectively reduce an internal stress which is produced during the firing step due to the difference in the coefficient of thermal contraction between the dielectric layers and the conductive layers and which acts on the boundary between the inner layer portion 11m and the second outer layer portion 12b2. As a result, the occurrence of cracks (delamination) at the boundary between the inner layer portion 11m and the second outer layer portion 12b2 is significantly reduced or prevented.

A description will be given below of an experiment for examining how the heights of an inner portion and an outer portion of the body of a capacitor and the content of Si therein influence the occurrence of cracks during a firing step and the reliability of the capacitor.

First Experiment

In a first experiment, a total of twenty-one types of capacitors according to comparative examples 1 through 11 and examples 1 through 10 were fabricated. Conditions (design values) applied to all the twenty-one types of capacitors will be discussed first.

The height of the first outer layer portion is about 40 µm, the height of the second outer layer portion is about 100 µm, the height of the inner layer portion is about 620 µm, the thickness of a conductive layer is about 0.8 µm, the number of conductive layers to be stacked is about 330, and the molar ratio of Si to Ti of the first dielectric layers is about 1.3 mol %.

The molar ratio of Si to Ti of the second dielectric layer defining the outer portion, the height of the inner portion, and the height of the outer portion of each of the twenty-one types of capacitors according to comparative examples 1 through 11 and examples 1 through 10 are indicated in Table 1, which is shown below.

For the evaluation concerning the occurrence of cracks during the firing of the capacitors, ten samples of each of the twenty-one types of capacitors were prepared. If the occurrence of cracks was observed in even one of the ten samples of each type of capacitor, the evaluation concerning the occurrence of cracks in this type of capacitor was determined to be "BAD", and if the occurrence of cracks was observed in none of the ten samples, the evaluation concerning the occurrence of cracks in this type of capacitor was determined to be "GOOD". The occurrence of cracks was checked by exposing a WT cross section passing through the center of the body of a capacitor by polishing the body and by observing the exposed WT cross section with an optical microscope.

For the evaluation concerning the reliability of the capacitors, twenty samples of each of the twenty-one types of capacitors were prepared. If a decrease in the IR value was observed in even one of the twenty samples of each type of capacitor, the reliability of this type of capacitor was determined to be "BAD", and if a decrease in the IR value was observed in none of the twenty samples, the reliability of this type of capacitor was determined to be "GOOD".

The evaluation of the reliability of the capacitors was performed by conducting a super-accelerating life test. More specifically, a voltage of about 8 V was continuously applied to each of the samples in an ambient temperature of about 150° C., and then, the time taken for the IR value of each of the samples to reduce to about 10 kΩ was measured. If the time was shorter than ten hours, it was determined that the IR value of the capacitor was decreased.

TABLE 1

| | Content of Si in first dielectric layer (mol %) | Content of Si in second dielectric layer (mol %) | Difference in the content of Si between first and second dielectric layers (mol %) | Height inner portion (μm) | Height of outer portion (μm) | Occurrence of cracks | Reliability |
|---|---|---|---|---|---|---|---|
| Example 1 | 1.3 | 1.7 | 0.4 | 10 | 90 | GOOD | GOOD |
| Example 2 | 1.3 | 1.7 | 0.4 | 20 | 80 | GOOD | GOOD |
| Example 3 | 1.3 | 1.7 | 0.4 | 30 | 70 | GOOD | GOOD |
| Example 4 | 1.3 | 1.7 | 0.4 | 40 | 60 | GOOD | GOOD |
| Example 5 | 1.3 | 1.7 | 0.4 | 50 | 50 | GOOD | GOOD |
| Comparative example 1 | 1.3 | 1.7 | 0.4 | 60 | 40 | BAD | GOOD |
| Comparative example 2 | 1.3 | 1.7 | 0.4 | 70 | 30 | BAD | GOOD |
| Example 6 | 1.3 | 2.9 | 1.6 | 10 | 90 | GOOD | GOOD |
| Example 7 | 1.3 | 2.9 | 1.6 | 20 | 80 | GOOD | GOOD |
| Example 8 | 1.3 | 2.9 | 1.6 | 30 | 70 | GOOD | GOOD |
| Example 9 | 1.3 | 2.9 | 1.6 | 40 | 60 | GOOD | GOOD |
| Example 10 | 1.3 | 2.9 | 1.6 | 50 | 50 | GOOD | GOOD |
| Comparative example 3 | 1.3 | 2.9 | 1.6 | 60 | 40 | BAD | GOOD |
| Comparative example 4 | 1.3 | 2.9 | 1.6 | 70 | 30 | BAD | GOOD |
| Comparative example 5 | 1.3 | 3.3 | 2.0 | 10 | 90 | GOOD | BAD |
| Comparative example 6 | 1.3 | 3.3 | 2.0 | 20 | 80 | GOOD | GOOD |
| Comparative example 7 | 1.3 | 3.3 | 2.0 | 30 | 70 | GOOD | GOOD |
| Comparative example 8 | 1.3 | 3.3 | 2.0 | 40 | 60 | GOOD | GOOD |
| Comparative example 9 | 1.3 | 3.3 | 2.0 | 50 | 50 | GOOD | GOOD |
| Comparative example 10 | 1.3 | 3.3 | 2.0 | 60 | 40 | BAD | GOOD |
| Comparative example 11 | 1.3 | 3.3 | 2.0 | 70 | 30 | BAD | GOOD |

Table 1 indicates the evaluation results of the first experiment. As indicated by Table 1, in the capacitors of examples 1 through 10 and comparative examples 5 through 9 in which the height of the outer portion was equal to or greater than the inner portion, the occurrence of cracks during the firing of the capacitors was significantly reduced or prevented.

The reliability of only the capacitor in comparative example 5 is "BAD". This shows that, when the molar ratio of Si to Ti of the second dielectric layer defining the outer portion is higher than about 2.9 mol % and when the height of the inner portion is smaller than about 20 μm, the reliability of the capacitor may be decreased.

A description will be given below of an experiment for examining how the boundary region of an outer portion having a high content of Si with an inner portion of the body of a capacitor influence the occurrence of cracks in the capacitor caused by an external stress.

Second Experiment

In a second experiment, a total of four types of capacitor mount bodies according to comparative examples 12 and 13 and examples 11 and 12 were fabricated. Conditions (design values) applied to all the four types of capacitor mount bodies will be discussed first.

The configuration of the first outer layer is set to be similar to that of the second outer layer portion. The height of the first outer layer portion is about 100 μm, the height of the second outer layer portion is about 100 μm, the height of the inner layer portion is about 620 μm, the thickness of a conductive layer is about 0.8 μm, and the number of conductive layers to be stacked is about 330.

The molar ratio of Si to Ti of the first dielectric layer and that of the second dielectric layer defining the outer portion and the height of the inner portion and that of the outer portion of each of the four types of capacitor mount bodies according to comparative examples 12 and 13 and examples 11 and 12 are indicated in Table 2, which is shown below.

For the evaluation concerning the occurrence of cracks in the capacitors due to an external stress, ten samples of each of the four types of capacitor mount bodies were prepared. If the occurrence of cracks reaching a conductive layer was observed in even one of the ten samples of each type of capacitor mount body, the evaluation concerning the occurrence of cracks in this type of capacitor was determined to be "BAD", and if the occurrence of cracks reaching a conductive layer was observed in none of the ten samples, the evaluation concerning the occurrence of cracks in this type of capacitor was determined to be "GOOD".

Figure 17:
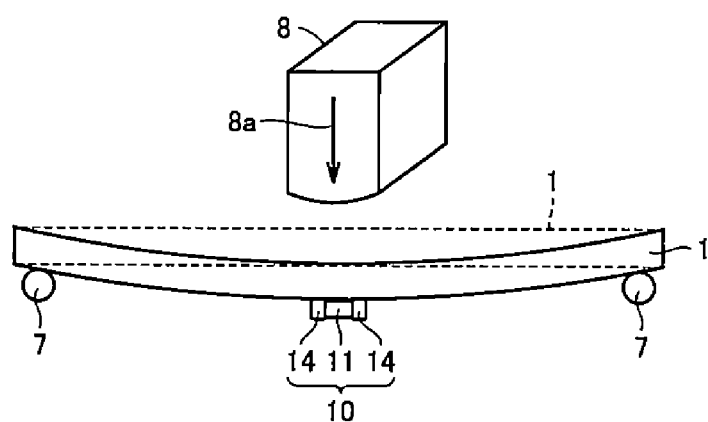
FIG. 17 is a schematic view illustrating a state in which a substrate having a multilayer ceramic capacitor thereon is bent in a second experiment.

FIG. 17 is a schematic view illustrating a state in which a substrate having a capacitor thereon is bent in the second experiment. The evaluation concerning the occurrence of cracks in the capacitors due to an external force was conducted in the following manner. As shown in FIG. 17, when the mounting member 1 having the capacitor 10 thereon was bent by using a pressing tool 8, an external stress was applied to the capacitor 10. Then, the occurrence of cracks in the capacitor 10 due to this external force was checked.

More specifically, the occurrence of cracks in the capacitor 10 due to this external force was checked in the following manner. In the state in which both ends of the bottom surface of the mounting member 1 having the capacitor 10 thereon were supported by two support members 7, the pressing tool 8 was vertically pressed against the top surface of the mounting member 1 from upward, as indicated by an arrow 8a in FIG. 17, so as to incline the mounting member 1 downward in a convex shape. As a result, a tensile stress (external stress) was applied to the body 11 of the capacitor 10 via the two outer electrodes 14. Then, the occurrence of cracks in the body 11 due to this tensile stress was checked. The occurrence of cracks was checked by exposing a cross section by polishing the body 11 and by observing the exposed cross section with an optical microscope.

layers 13 are positioned and the height $T_1$ of the inner portion 11m is greater than the width $W_0$ of the body 11.

Third Experiment

In a third experiment, for examining how the nonlinearity of the boundary region influences the occurrence of interface separation, seven types of capacitors according to examples 13 through 19 were fabricated. In these capacitors, the height of the inner portion and that of the outer portion were set to be the same, and the height thereof was varied.

Figure 18:
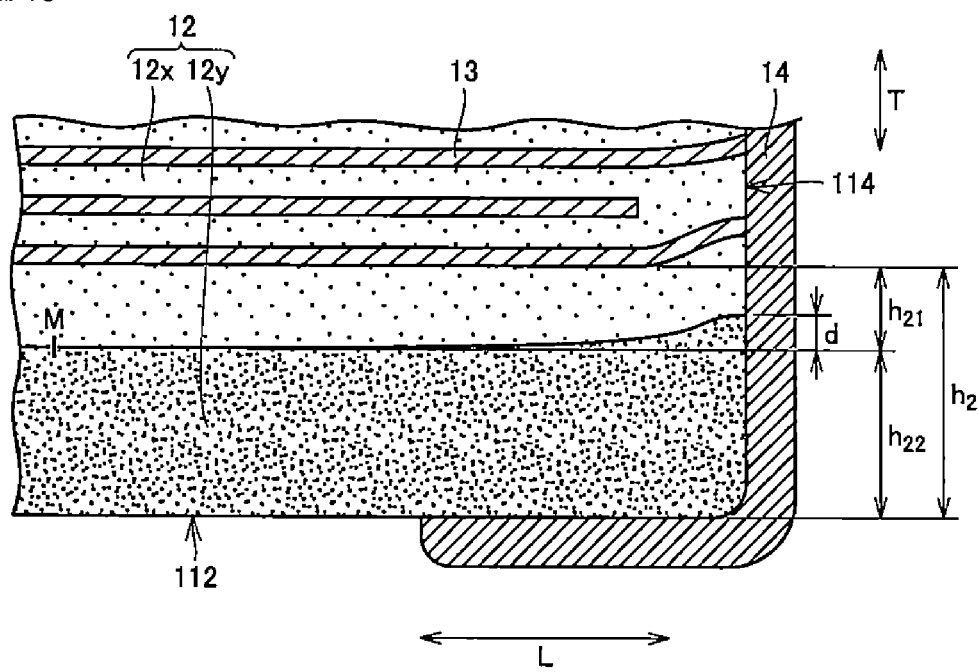
FIG. 18 is a sectional view illustrating an evaluation method for the nonlinearity of a boundary region in a third experiment.

The evaluation of the nonlinearity of the boundary region was conducted in the following manner. As shown in FIG. 18, in an LT cross section of a capacitor, a tangent line passing through a center point M of the boundary region 12z in the length direction L and touching the boundary region 12z was drawn. The shortest distance d from the intersection between the end surface 113 or 114 of the body 11 and the boundary region 12z to the tangent line was measured. If the shortest distance d was smaller than about 5 μm, the nonlinearity of the boundary region 12z was determined to be "C". If the shortest distance d was equal to or greater than about 5 μm and was smaller than the height $h_{21}$ of the inner portion 12b21, the nonlinearity of the boundary region 12z was determined to be "B". If the shortest distance d was equal to or greater than the height $h_{21}$ of the inner portion 12b21, the nonlinearity of the boundary region 12z was

TABLE 2

|  | Content of Si in first dielectric layer (mol %) | Content of Si in second dielectric layer (mol %) | Height of inner portion (μm) | Height of outer portion (μm) | Presence of Boundary | Occurrence of cracks |
|---|---|---|---|---|---|---|
| Example 11 | 1.3 | 1.7 | 50 | 50 | YES | GOOD |
| Comparative example 12 | 1.7 | 1.7 | 50 | 50 | NO | BAD |
| Example 12 | 1.3 | 2.9 | 50 | 50 | YES | GOOD |
| Comparative example 13 | 2.9 | 2.9 | 50 | 50 | NO | BAD |

Table 2 indicates the evaluation results of the second experiment. As indicated by Table 2, the occurrence of cracks reaching a conductive layer was not observed in the capacitor mount bodies according to examples 11 and 12 in which the content ratio of Si of the outer portion was higher than that of the inner portion. In examples 11 and 12, even if cracks occurred in the outer portion, they did not penetrate into the inner portion. From these evaluation results, a boundary region of an outer portion having a higher content of Si with an inner portion may have a function of preventing cracks from reaching a conductive layer by significantly reducing or preventing the development of cracks or changing the direction in which cracks develop.

Particularly, various preferred embodiments of the present invention are effectively applicable to small capacitors in which the height of the second outer layer portion 12b2 is about 50 μm or greater, the electrostatic capacitance is about 10 μF or higher, the length of the body 11 is about 1.8 mm or smaller, and the number of conductive layers 13 to be stacked is about 300 or greater, for example.

Among small capacitors, various preferred embodiments of the present invention are effectively applicable to capacitors in which the height $T_1$ of the inner portion 11m in the stacking direction of the body 11 is greater than the width $W_1$ of the inner portion 11m where a plurality of conductive determined to be "A". "C" means that the nonlinearity is low and "A" means that the nonlinearity is high.

After a thermal shock cycle was applied to the fired capacitor chips by repeatedly increasing and decreasing the temperature, LT cross sections were observed with an optical microscope. Ten samples of each of the seven types of capacitors according to examples 13 through 19 were prepared. All of the ten samples of each type of capacitor were observed with an optical microscope. If the occurrence of cracks at the interface of the boundary region 12z (interface separation) was observed in even one of the ten samples of each type of capacitor, the evaluation concerning the interface separation in this type of capacitor was determined to be "BAD", and if the occurrence of cracks was observed in none of the ten samples, the evaluation concerning the interface separation in this type of capacitor was determined to be "GOOD". The results are shown in Table 3.

TABLE 3

|  | Height of inner portion (μm) | Height of outer portion (μm) | Nonlinearity of boundary region | Interface separation after the application of thermal shock |
|---|---|---|---|---|
| Example 13 | 20 | 20 | A | GOOD |
| Example 14 | 40 | 40 | A | GOOD |

TABLE 3-continued

| | Height of inner portion (μm) | Height of outer portion (μm) | Nonlinearity of boundary region | Interface separation after the application of thermal shock |
|---|---|---|---|---|
| Example 15 | 50 | 50 | B | GOOD |
| Example 16 | 60 | 60 | B | GOOD |
| Example 17 | 70 | 70 | C | BAD |
| Example 18 | 80 | 80 | C | BAD |
| Example 19 | 90 | 90 | C | BAD |

Table 3 indicates the evaluation results of the third experiment. As indicated by Table 3, in examples 13 through 16 in which the nonlinearity is determined to be "A" or "B", interface separation did not occur in the capacitor chips even after a thermal shock was applied. From this result, it is seen that, in a configuration in which the nonlinearity is high, that is, the end portions of the boundary region incline sharply, it may be possible to significantly reduce or prevent the occurrence of interface separation. Particularly, in examples 13 and 14 in which the nonlinearity is determined to be "A", not only the occurrence of interface separation at the boundary is significantly reduced or prevented, but also, the occurrence of cracks between the inner layer portion and the outer layer portion is significantly reduced or prevented, thus significantly contributing to reducing the structural defect. Table 3 shows that the nonlinearity is increased by setting the height $h_{21}$ of the inner portion to be about 60 μm or smaller.

Fourth Experiment

Similarly, in a fourth experiment, for examining how the nonlinearity of the boundary region influences the occurrence of interface separation, seven types of capacitors according to examples 20 through 26 were fabricated. The evaluation of the nonlinearity of the boundary region was conducted in the following manner. In a WT cross section of a capacitor, a tangent line passing through a center point M of the boundary region 12z in the width direction W and touching the boundary region 12z was drawn. The shortest distance d from the intersection between the side surface 115 or 116 of the body 11 and the boundary region 12z to the tangent line was measured. If the shortest distance d was smaller than about 5 μm, the nonlinearity of the boundary region 12z was determined to be "C". If the shortest distance d was equal to or greater than about 5 μm and was smaller than the height $h_{21}$ of the inner portion 12b21, the nonlinearity of the boundary region 12z was determined to be "B". If the shortest distance d was equal to or greater than the height $h_{21}$ of the inner portion 12b21, the nonlinearity of the boundary region 12z was determined to be "A".

TABLE 4

| | Height of inner portion (μm) | Height of outer portion (μm) | Nonlinearity of boundary region | Interface separation after the application of thermal shock |
|---|---|---|---|---|
| Example 20 | 20 | 20 | A | GOOD |
| Example 21 | 40 | 40 | A | GOOD |
| Example 22 | 50 | 50 | B | GOOD |
| Example 23 | 60 | 60 | B | GOOD |
| Example 24 | 70 | 70 | B | GOOD |
| Example 25 | 80 | 80 | C | BAD |
| Example 26 | 90 | 90 | C | BAD |

Table 4 indicates the evaluation results of the fourth experiment. As indicated by Table 4, in examples 20 through 24 in which the nonlinearity is determined to be "A" or "B", interface separation did not occur in the capacitor chips even after a thermal shock was applied. From this result, it is seen that, in a configuration in which the nonlinearity is high, that is, the end portions of the boundary region incline sharply, it may be possible to significantly reduce or prevent the occurrence of interface separation. Particularly, in examples 20 and 21 in which the nonlinearity is determined to be "A", not only the occurrence of interface separation at the boundary is significantly reduced or prevented, but also, the occurrence of cracks between the inner layer portion and the outer layer portion is significantly reduced or prevented, thus significantly contributing to reducing the structural defect. Table 4 shows that the nonlinearity is increased by setting the height $h_{21}$ of the inner portion to be about 70 μm or smaller.

Figure 19:
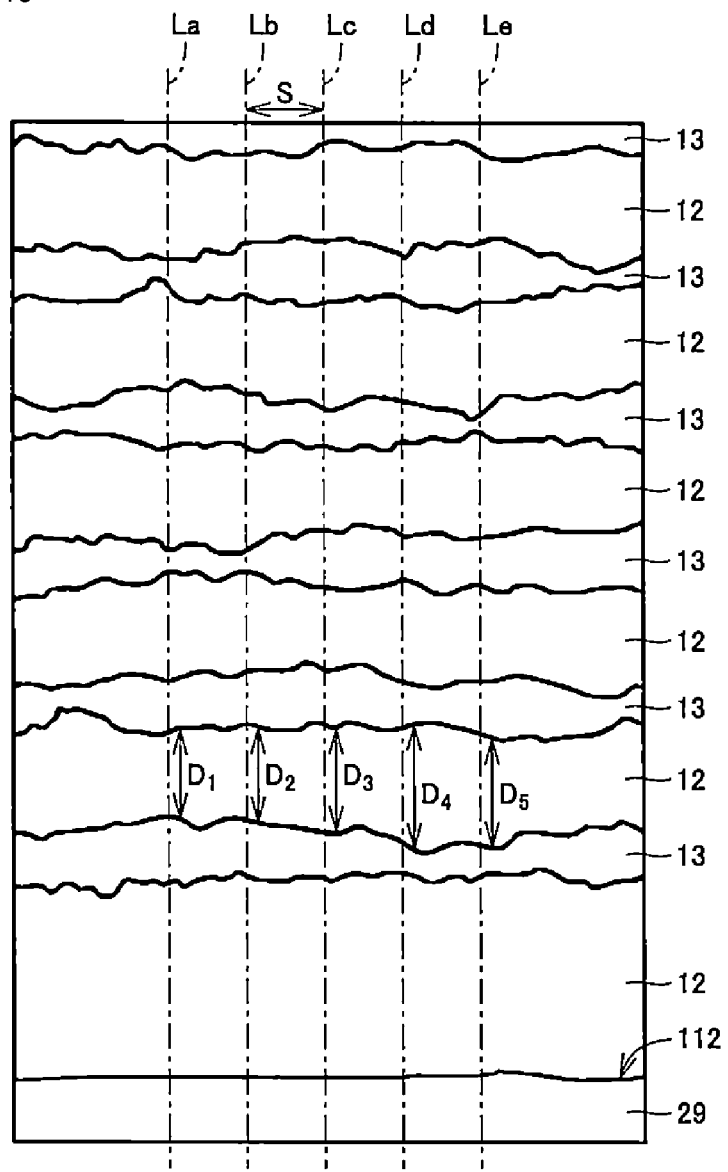
FIG. 19 illustrates an example of an enlarged image of a cross section of a multilayer ceramic capacitor observed with a scanning electron microscope (SEM).

Measurement methods for the thickness of a dielectric layer and that of a conductive layer of a capacitor will be discussed below. FIG. 19 illustrates an example of an enlarged image of a cross section of a capacitor observed with a scanning electron microscope (SEM). In FIG. 19, a portion of the second main surface 112 of the capacitor in contact with an embedding resin 29 is shown.

When measuring the thickness of a dielectric layer and that of a conductive layer of a capacitor, the following method is used. In an enlarged image of a cross section of a capacitor observed with a SEM, as shown in FIG. 19, a straight line Lc extending in the stacking direction of the body of the capacitor and passing through the center of the body is drawn. Then, a plurality of straight lines parallel with the straight line Lc are drawn at equal pitches S. The pitch S may be set to be about five to ten times as long as the thickness of a dielectric layer or that of a conductive layer to be measured. If, for example, a dielectric layer having a thickness of about 1 μm is measured, the pitch S is set to be about 5 μm. The number of lines drawn on one side and that on the other side of the straight line Lc are the same. That is, an odd number of lines including the straight line Lc are drawn. In FIG. 19, an example in which five straight lines La through Le are drawn is shown.

Then, on each of the lines La through Le, the thickness of a dielectric layer and that of a conductive layer are measured. If, on each of the straight lines La through Le, a conductive layer is missing and dielectric layers join each other with the conductive layer therebetween, or if an enlarged image at a portion to be measured is not clear, the thickness or the distance is measured on another straight line separated from the straight line Lc.

When measuring the thickness of a dielectric layer 12, as shown in FIG. 19, the thickness $D_1$ on the straight line La, the thickness $D_2$ on the straight line Lb, the thickness $D_3$ on the straight line Lc, the thickness $D_4$ on the straight line Ld, and the thickness $D_5$ on the straight line Le are measured, and the average value thereof is set to be the thickness of the dielectric layer 12.

When calculating the average thickness of the plurality of dielectric layers 12 included in the inner layer portion 11m, the thicknesses of a total of five dielectric layers 12 constituted by the dielectric layer 12 positioned substantially at the center of the inner layer portion 11m in the thickness direction T and two dielectric layers 12 positioned at each of both sides of this dielectric layer 12 are measured by using the above-described method, and the average value thereof is set to be the average thickness of the plurality of dielectric layers 12 included in the inner layer portion 11m.

If the number of stacked dielectric layers 12 is less than five, the thicknesses of all the dielectric layers 12 are measured by using the above-described method, and the average value thereof is set to be the average thickness of the dielectric layers 12.

A method for measuring the width of the side portion margins 12c is as follows. A WT cross section passing through the center of the body 11 is exposed by polishing the body 11 and is observed with an optical microscope. Then, the side margin portion 12c having the largest width is measured.

A method for measuring the length of the end portion margins 12e is as follows. An LT cross section passing through the center of the body 11 is exposed by polishing the body 11 and is observed with an optical microscope. Then, the end margin portion 12c having the largest length is measured.

A method for measuring the width $W_1$ of the inner layer portion 11m is as follows. A WT cross section passing through the center of the body 11 is exposed by polishing the body 11 and is observed with an optical microscope. Then, the widths of the first outermost conductive layer 13, the second outermost conductive layer 13, and the conductive layer 13 positioned closest to the center of the inner layer portion 11m in the stacking direction are measured, and the average value of the three measured widths is calculated.

A method for measuring the length $L_1$ of the inner layer portion 11m is as follows. An LT cross section passing through the center of the body 11 is exposed by polishing the body 11 and is observed with an optical microscope. Then, the lengths of the first outermost conductive layer 13, the second outermost conductive layer 13, and the conductive layer 13 positioned closest to the center of the inner layer portion 11m in the stacking direction are measured, and the average value of the three measured lengths is calculated.

A method for measuring the height $T_1$ of the inner layer portion 11m is as follows. A WT cross section passing through the center of the body 11 is exposed by polishing the body 11 and is observed with an optical microscope. Then, the length of a line segment passing through the center of the body 11 and connecting the first and second outermost conductive layers 13 with the shortest distance is measured.

A method for measuring the height $h_1$ of the first outer layer portion 12b1 or the height $h_2$ of the second outer layer portion 12b2 is as follows. A WT cross section passing through the center of the body 11 is exposed by polishing the body 11 and is observed with an optical microscope. Then, the height $h_1$ of the first outer layer portion 12b1 or the height $h_2$ of the second outer layer portion 12b2 at the center of the body 11 in the width direction W is measured.

Analysis for the composition of components contained in the first dielectric layer 12x or the second dielectric layer 12y may be conducted by using inductively coupled plasma (ICP) emission spectrometry or a WDX. If elemental analysis is conducted by using ICP emission spectrometry, a sample is formed into a powder and is dissolved with an acid. Then, the resulting solution is subjected to ICP emission spectrometry, thus specifying the composition. If elemental analysis is conducted by using a WDX, a WT cross section is exposed by polishing the body of a capacitor embedded in a resin, and then, the composition is specified by using a WDX attached to a SEM.

The boundary region of the outer portion having a high content of Si with the inner portion may be identified as follows. A WT cross section is exposed by polishing the body of a capacitor embedded in a resin, and a backscattered electron image of the exposed WT cross section is captured and observed by using a SEM. Alternatively, the boundary region may be identified by creating element mapping of the exposed WT cross section by using a WDX attached to a SEM and by specifying a portion having a high content of Si.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a body that includes a plurality of dielectric layers and a plurality of conductive layers stacked on each other in a stacking direction and that includes first and second main surfaces opposing each other in the stacking direction, first and second end surfaces opposing each other in a length direction and connecting the first and second main surfaces, and first and second side surfaces opposing each other in a width direction and connecting the first and second main surfaces and the first and second end surfaces; and
first and second outer electrodes that are disposed on portions of a surface of the body; wherein
the plurality of conductive layers include first conductive layers connected to the first outer electrode and second conductive layers connected to the second outer electrode;
the body includes a first outer layer portion including a first of the plurality of dielectric layers defining the first main surface, a second outer layer portion including a second of the plurality of dielectric layers defining the second main surface, and an inner layer portion adjacent to both of the first outer layer portion and the second outer layer portion, the inner layer portion includes a portion extending from a first outermost conductive layer positioned closest to the first main surface among the plurality of conductive layers through a second outermost conductive layer positioned closest to the second main surface among the plurality of conductive layers;
the second outer layer portion includes an outer portion including the second main surface and an inner portion disposed adjacent to both of the outer portion and the inner layer portion;
a composition ratio of Si relative to Ti of the outer portion is higher than that of the inner portion;
the outer portion includes a boundary region adjacent to the inner portion, the boundary region has a larger Si content compared to a central region of the outer portion in the stacking direction; and
as viewed from the width direction, the boundary region includes a portion which inclines toward the first main surface as the boundary region gets closer to one of the first and second end surfaces.

2. The multilayer ceramic capacitor according to claim 1, wherein
- as viewed from the length direction, the boundary region includes a portion which inclines toward the first main surface as the boundary region gets closer to one of the first and second side surfaces; and
- a maximum distance in the stacking direction between the second main surface and the boundary region at a cross section of the body which is perpendicular to the length direction and including a center of the body is greater than a maximum distance in the stacking direction between the second main surface and the boundary region at a cross section of the body which is perpendicular to the width direction and including the center of the body.

3. The multilayer ceramic capacitor according to claim 2, wherein
- the first and second outer electrodes are disposed on portions of the second main surface of the body; and
- a surface region adjacent to the inner portion in the outer portion has a higher content of Si than a central region of the outer portion in the stacking direction.

4. The multilayer ceramic capacitor according to claim 2, wherein a composition ratio of a rare earth element relative to Ti of the dielectric layers included in the inner layer portion is higher than that of the outer portion.

5. The multilayer ceramic capacitor according to claim 1, wherein a composition ratio of Mn relative to Ti of the dielectric layer included in the inner layer portion, a composition ratio of Mn relative to Ti of the dielectric layer included in the first outer layer portion, and a composition ratio of Mn relative to Ti of the dielectric layer included in the inner portion is higher than that of the outer portion.

6. The multilayer ceramic capacitor according to claim 1, wherein
- as viewed from the width direction, the first outermost conductive layer includes a portion which inclines toward the second main surface and the second outermost conductive layer includes a portion which inclines toward the first main surface; and
- an amount by which the portion of the second outermost conductive layer inclines is greater than an amount by which the portion of the first outermost conductive layer inclines.

7. A multilayer ceramic capacitor comprising:
- a body that includes a plurality of dielectric layers and a plurality of conductive layers stacked on each other in a stacking direction and that includes first and second main surfaces opposing each other in the stacking direction, first and second end surfaces opposing each other in a length direction and connecting the first and second main surfaces, and first and second side surfaces opposing each other in a width direction and connecting the first and second main surfaces and the first and second end surfaces; and
- first and second outer electrodes that are disposed on portions of a surface of the body; wherein
- the plurality of conductive layers include first conductive layers connected to the first outer electrode and second conductive layers connected to the second outer electrode;
- the body includes a first outer layer portion including a first of the plurality of dielectric layers defining the first main surface, a second outer layer portion including a second of the plurality of dielectric layers defining the second outer layer portion, the inner layer portion includes a portion extending from a first outermost conductive layer positioned closest to the first main surface among the plurality of conductive layers through a second outermost conductive layer positioned closest to the second main surface among the plurality of conductive layers;
- the second outer layer portion includes an outer portion including the second main surface and an inner portion disposed adjacent to both of the outer portion and the inner layer portion;
- a composition ratio of Si to relative Ti of the outer portion is higher than that of the inner portion;
- the outer portion includes a boundary region adjacent to the inner portion, the boundary portion has a larger Si content compared to a central region of the outer portion in the stacking direction; and
- as viewed from the length direction, the boundary region includes a portion which inclines toward the first main surface as the boundary region gets closer to one of the first and second side surfaces.

8. The multilayer ceramic capacitor according to claim 7, wherein a composition ratio of a rare earth element relative to Ti of the dielectric layers included in the inner layer portion is higher than that of the outer portion.

9. The multilayer ceramic capacitor according to claim 7, wherein a composition ratio of Mn relative to Ti of the dielectric layer included in the inner layer portion, a composition ratio of Mn relative to Ti of the dielectric layer included in the first outer layer portion, and a composition ratio of Mn relative to Ti of the dielectric layer included in the inner portion is higher than that of the outer portion.

10. The multilayer ceramic capacitor according to claim 7, wherein
- as viewed from the width direction, the first outermost conductive layer includes a portion which inclines toward the second main surface and the second outermost conductive layer includes a portion which inclines toward the first main surface; and
- an amount by which the portion of the second outermost conductive layer inclines is greater than an amount by which the portion of the first outermost conductive layer inclines.

11. A multilayer ceramic capacitor comprising:
- a body that includes a plurality of dielectric layers and a plurality of conductive layers stacked on each other in a stacking direction and that includes first and second main surfaces opposing each other in the stacking direction, first and second end surfaces opposing each other in a length direction and connecting the first and second main surfaces, and first and second side surfaces opposing each other in a width direction and connecting the first and second main surfaces and the first and second end surfaces; and
- first and second outer electrodes that are disposed on portions of a surface of the body, wherein
- the plurality of conductive layers include first conductive layers connected to the first outer electrode and second conductive layers connected to the second outer electrode; wherein
- the body includes:
  - a first outer layer portion including a first of the plurality of dielectric layers defining the first main surface;
  - a second outer layer portion including a second of the plurality of dielectric layers defining the second main surface; and an inner layer portion adjacent to both of the first outer layer portion and the second outer layer portion, the inner layer portion includes a portion extending from a first outermost conductive layer positioned closest to the first main surface among the plurality of conductive layers through a second outermost conductive layer positioned closest to the second main surface among the plurality of conductive layers;

the second outer layer portion includes an outer portion including the second main surface and an inner portion disposed adjacent to both of the outer portion and the inner layer portion; and a maximum distance in the stacking direction between the second main surface and the outer portion at a cross section of the body which is perpendicular to the length direction and including a center of the body is greater than a maximum distance in the stacking direction between the second main surface and the outer portion at a cross section of the body which is perpendicular to the width direction and including the center of the body.

12. The multilayer ceramic capacitor according to claim 11, wherein an end of the outer portion in the length direction projects toward the first main surface in a cross section of the body which is perpendicular to length direction and including a center of the body.

13. The multilayer ceramic capacitor according to claim 12, wherein the outer portion includes a boundary region adjacent to the inner portion, the boundary region has a larger Si content compared to a central region of the outer portion in the stacking direction; and the boundary region includes a portion which inclines toward the first main surface as the boundary region gets closer to one of the first and second side surfaces in a cross section of the body which is perpendicular to length direction and including a center of the body.

14. The multilayer ceramic capacitor according to claim 12, wherein an end of the outer portion in the length direction projects toward the first main surface in a cross section of the body which is perpendicular to width direction and including a center of the body.

15. The multilayer ceramic capacitor according to claim 14, wherein the outer portion includes a boundary region adjacent to the inner portion, the boundary region has a larger Si content compared to a central region of the outer portion in the stacking direction; and the boundary region includes a portion which inclines toward the first main surface as the boundary region gets closer to one of the first and second end surfaces in the cross section of the body which is perpendicular to width direction and including a center of the body.

16. The multilayer ceramic capacitor according to claim 14, wherein a composition ratio of Si relative to Ti of the outer portion is higher than that of the inner portion.

17. The multilayer ceramic capacitor according to claim 14, wherein a composition ratio of a rare earth element relative to Ti of the dielectric layers included in the inner layer portion is higher than that of the outer portion.

18. The multilayer ceramic capacitor according to claim 14, wherein a composition ratio of Mn relative to Ti of the dielectric layer included in the inner layer portion, a composition ratio of Mn relative to Ti of the dielectric layer included in the first outer layer portion, and a composition ratio of Mn relative to Ti of the dielectric layer included in the inner portion is higher than that of the outer portion.

19. The multilayer ceramic capacitor according to claim 14, wherein as viewed from the width direction, the first outermost conductive layer includes a portion which inclines toward the second main surface and the second outermost conductive layer includes a portion which inclines toward the first main surface; and an amount by which the portion of the second outermost conductive layer inclines is greater than an amount by which the portion of the first outermost conductive layer inclines.

* * * * *